United States Patent
Stroke et al.

(10) Patent No.: US 11,836,690 B1
(45) Date of Patent: Dec. 5, 2023

(54) SYSTEMS AND METHODS FOR PRIVATE NETWORK ISSUANCE OF DIGITAL CURRENCY

(71) Applicant: Wells Fargo Bank, N.A., San Francisco, CA (US)

(72) Inventors: Nikolai Stroke, Gilbert, CA (US); Duc M. Trinh, Golden Valley, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/718,956

(22) Filed: Apr. 12, 2022

(51) Int. Cl.
 *G06Q 20/06* (2012.01)
 *G06Q 20/38* (2012.01)
 *G06Q 20/40* (2012.01)
 *G06Q 20/36* (2012.01)

(52) U.S. Cl.
 CPC ..... *G06Q 20/0655* (2013.01); *G06Q 20/3674* (2013.01); *G06Q 20/3829* (2013.01); *G06Q 20/38215* (2013.01); *G06Q 20/401* (2013.01); *H04L 2209/56* (2013.01)

(58) Field of Classification Search
 CPC ........... G06Q 20/0655; G06Q 20/3674; G06Q 20/38215; G06Q 20/3829; G06Q 20/401
 USPC .......................................................... 705/41
 See application file for complete search history.

(56) References Cited

U.S. PATENT DOCUMENTS

| | | | |
|---|---|---|---|
| 10,097,356 B2 | 10/2018 | Zinder | |
| 10,373,129 B1 * | 8/2019 | James | ........................ H04L 9/06 |
| 10,438,290 B1 * | 10/2019 | Winklevoss | ......... G06Q 20/389 |
| 10,614,478 B1 | 4/2020 | Georgi | |
| 10,762,478 B1 * | 9/2020 | Maeng | ............... G06Q 20/0658 |
| 11,200,569 B1 * | 12/2021 | James | ................... G06Q 20/381 |
| 2014/0279551 A1 | 9/2014 | Samid | |
| 2015/0039496 A1 | 2/2015 | Shuster | |
| 2018/0254898 A1 | 9/2018 | Sprague et al. | |
| 2018/0268382 A1 | 9/2018 | Wasserman | |
| 2019/0295069 A1 | 9/2019 | Pala et al. | |
| 2020/0005283 A1 | 1/2020 | Zimmerman et al. | |
| 2020/0286076 A1 | 9/2020 | Zhu et al. | |

(Continued)

FOREIGN PATENT DOCUMENTS

| | | | | |
|---|---|---|---|---|
| CN | 107230049 A | * | 10/2017 | ........... G06Q 20/065 |
| CN | 107230070 A | * | 10/2017 | ........... G06Q 20/065 |

(Continued)

OTHER PUBLICATIONS

"Bitcoin Off-Chain Transactions: Their Invention and Use," by Michelle Mount. Geo. L. Tech. Rev. 4. 2020. Pgs. 685-698. (Year: 2020).*

(Continued)

*Primary Examiner* — Sara C Hamilton
(74) *Attorney, Agent, or Firm* — Foley & Lardner LLP

(57) ABSTRACT

Systems, methods, and computer-readable storage media of private network issuance of digital currency. One method includes establishing, via a first private network, a first private network connection between a digital wallet application of a user device and the processing circuit. The method further includes receiving an issuance request associated with a first denomination of digital currency. The method further includes issuing a first digital currency token, wherein issuing is an off-chain exchange transferring the first denomination outside a digital currency ledger.

20 Claims, 7 Drawing Sheets

(56) References Cited

U.S. PATENT DOCUMENTS

| | | |
|---|---|---|
| 2021/0012326 A1 | 1/2021 | Maxwell Zelocchi |
| 2021/0124760 A1 | 4/2021 | Klein et al. |
| 2021/0217002 A1 | 7/2021 | Basu et al. |
| 2021/0233170 A1 | 7/2021 | Cadet |
| 2021/0258169 A1 | 8/2021 | Basu et al. |
| 2022/0029815 A1 | 1/2022 | Basu et al. |
| 2022/0292496 A1 | 9/2022 | Yan |
| 2023/0036439 A1 | 2/2023 | Olson et al. |

FOREIGN PATENT DOCUMENTS

| | | |
|---|---|---|
| EP | 3 073 670 B1 | 9/2016 |
| WO | WO-2022154789 A1 * | 7/2022 |

OTHER PUBLICATIONS

"The Bitcoin Lightening Network: Scalable Off-Chain Instant Payments," by Joseph Poon; and Thaddeus Dryia. Jan. 14, 2016. (Year: 2016).*

Are Central Bank Digital Currencies (CBDCs) the money of tomorrow.

Shehnaz Ahmed, Private partners could help RBI run a digital currency.

\* cited by examiner

SYSTEMS AND METHODS FOR PRIVATE NETWORK ISSUANCE OF DIGITAL CURRENCY

CROSS-REFERENCE TO RELATED PATENT APPLICATIONS

This application is related to U.S. patent application Ser. No. 17/718,966, titled "Systems and Methods for Custodianship of Digital Currency Utilizing Tiered Models," filed on Apr. 12, 2022, and U.S. patent application Ser. No. 17/718,974, titled "Systems and Methods of Micro-Allocating Digital Currency Using a Digital Wallet Network," filed on Apr. 12, 2022, all of which are incorporated herein by reference in their entireties and for all purposes.

BACKGROUND

The present disclosure relates generally to the field of digital currency technology. In a computer networked environment such as the internet, users and entities such as people or companies exchange goods and services using digital currency.

SUMMARY

Some arrangements relate to a method of private network issuance of digital currency. The method includes establishing, by a processing circuit via a first private network, a first private network connection between a digital wallet application of a user device and the processing circuit. Further, the method includes receiving, by the processing circuit, an issuance request associated with a first denomination of digital currency. Further, the method includes issuing, by the processing circuit, a first digital currency token, wherein issuing is an off-chain exchange transferring the first denomination outside a digital currency ledger, and wherein issuing includes generating, by the processing circuit, the first digital currency token including one or more metadata fields based on a reallocation of at least one digital currency token of a plurality of digital currency tokens stored on the digital currency ledger, wherein reallocation includes updating a token value of the at least one digital currency token on the digital currency ledger utilizing at least one public and private key pair. Further, issuing includes generating, by the processing circuit, an issuance identifier associated with the issuance request. Further, issuing includes setting, by the processing circuit, the issuance identifier in an identifier field of the one or more metadata fields of the first digital currency token. Further, issuing includes transmitting, by the processing circuit via the first private network, the first digital currency token to the digital wallet application.

In some arrangements, issuing the first digital currency token is based on a rule dataset, wherein the rule dataset includes a plurality of authorization rules limiting one or more functionalities of the first digital currency token, and wherein the plurality of digital currency tokens represents a tradable asset. In various arrangements, the identifier field of the digital currency token further includes a banknote identifier associating the digital currency token with a central provider system. In some arrangements, the method further includes tracking, by the processing circuit, the first digital currency token stored in the digital wallet application based on the identifier field, wherein tracking occurs based on an opt-in by the user device. In various arrangements, in response to determining the digital currency ledger has deficient funds to satisfy the issuance request, the method further includes establishing, by the processing circuit via a second private network, a second private network connection between a central provider system and the processing circuit, transmitting, by the processing circuit via the second private network, a replenishment request associated with a second denomination of additional digital currency, wherein the second denomination is greater than the first denomination, receiving, by the processing circuit via the second private network, additional digital currency tokens including one or more metadata fields based on the replenishment request, storing, by the processing circuit, the additional digital currency tokens, and updating, by the processing circuit, the digital currency ledger based on the second denomination of additional digital currency. In some arrangements, the processing circuit includes a software appliance configured to establish the first private network connection, and wherein establishing the first private network connection further includes installing, by the processing circuit, the software appliance including a software stack. In various arrangements, installing the software appliance by the processing circuit includes verifying the processing circuit meets one or more system requirements, wherein the one or more system requirements includes at least a hardware requirement, hardening the processing circuit, in response to successfully hardening the processing circuit, storing and configuring the software appliance on the processing circuit based on the software stack, and authenticating the software appliance with a central provider system. In some arrangements, establishing the first private network connection is in response to authenticating, by the processing circuit, a login by the user device into the digital wallet application. In various arrangements, the reallocation of the at least one digital currency token includes either splitting, by the processing circuit, a second digital currency token into the first digital currency token including the first denomination and a third digital currency token including a leftover denomination, wherein the first digital currency token and the third digital currency token are copied by the processing circuit to include the one or more metadata fields of the second digital currency token, or aggregating at least two digital currency tokens of the plurality of digital currency tokens including an aggregate denomination of the at least two digital currency tokens and copies of the one or more metadata fields of each of the at least two digital currency tokens. In some arrangements, generating the digital currency token includes both splitting, by the processing circuit, a second digital currency token into the first digital currency token including the first denomination and a third digital currency token including a leftover denomination, wherein the first digital currency token and the third digital currency token are copied by the processing circuit to include the one or more metadata fields of the second digital currency token, and aggregating at least two digital currency tokens of the plurality of digital currency tokens including an aggregate denomination of the at least two digital currency tokens and copies of the one or more metadata fields of each of the at least two digital currency tokens, and wherein the at least two digital currency tokens include the first digital currency token. In various arrangements, wherein issuing further includes updating, by the processing circuit, the digital currency ledger based on the first denomination of the first digital currency token. In some arrangements, the digital currency ledger includes a blockchain, and wherein the off-chain exchange is an exchange of digital currency occurring off the blockchain.

Some arrangements relate to a system with at least one processing circuit having at least one processor coupled to at least one memory. The at least one processing circuit can be configured to establish, via a first private network, a first private network connection between a digital wallet application of a user device and the processing circuit. Further, the at least one processing circuit can be configured to receive an issuance request associated with a first denomination of digital currency. Further, the at least one processing circuit can be configured to issue a first digital currency token, wherein issuing is an off-chain exchange transferring the first denomination outside a digital currency ledger, and wherein issuing includes generating the first digital currency token including one or more metadata fields based on a reallocation of at least one digital currency token of a plurality of digital currency tokens stored on the digital currency ledger, wherein reallocation includes updating a token value of the at least one digital currency token on the digital currency ledger utilizing at least one public and private key pair. Further, the at least one processing circuit can be configured to generate an issuance identifier associated with the issuance request. Further, the at least one processing circuit can be configured to set the issuance identifier in an identifier field of the one or more metadata fields of the first digital currency token. Further, the at least one processing circuit can be configured to transmit, via the first private network, the first digital currency token to the digital wallet application.

In some arrangements, issuing the first digital currency token is based on a rule dataset, wherein the rule dataset includes a plurality of authorization rules limiting one or more functionalities of the first digital currency token, and wherein the plurality of digital currency tokens represents a tradable asset. In various arrangements, the at least one processing circuit can be further configured to track the first digital currency token stored in the digital wallet application based on the identifier field, wherein tracking occurs based on an opt-in by the user device. In some arrangements in response to determining the digital currency ledger has deficient funds to satisfy the issuance request, wherein the at least one processing circuit is further configured to establish via a second private network, a second private network connection between a central provider system and the at least one processing circuit, transmit, via the second private network, a replenishment request associated with a second denomination of additional digital currency, wherein the second denomination is greater than the first denomination, receive, via the second private network, additional digital currency tokens including one or more metadata fields based on the replenishment request, store the additional digital currency tokens, and update the digital currency ledger based on the second denomination of additional digital currency. In various arrangements, the reallocation of the at least one digital currency token includes either splitting a second digital currency token into the first digital currency token including the first denomination and a third digital currency token including a leftover denomination, wherein the first digital currency token and the third digital currency token are copied by the at least one processing circuit to include the one or more metadata fields of the second digital currency token or aggregating at least two digital currency tokens of the plurality of digital currency tokens including an aggregate denomination of the at least two digital currency tokens and copies of the one or more metadata fields of each of the at least two digital currency tokens. In some arrangements, generating the digital currency token includes both splitting a second digital currency token into the first digital currency token including the first denomination and a third digital currency token including a leftover denomination, wherein the first digital currency token and the third digital currency token are copied by the at least one processing circuit to include the one or more metadata fields of the second digital currency token, and aggregating at least two digital currency tokens of the plurality of digital currency tokens including an aggregate denomination of the at least two digital currency tokens and copies of the one or more metadata fields of each of the at least two digital currency tokens, and wherein the at least two digital currency tokens include the first digital currency token.

Some arrangements relate to one or more computer-readable storage media having instructions stored thereon that, when executed by at least one processing circuit, cause the at least one processing circuit to establish, via a first private network, a first private network connection between a digital wallet application of a user device and the processing circuit. Further, the one or more computer-readable storage media having instructions stored thereon that, when executed by at least one processing circuit, cause the at least one processing circuit to receive an issuance request associated with a first denomination of digital currency. Further, the one or more computer-readable storage media having instructions stored thereon that, when executed by at least one processing circuit, cause the at least one processing circuit to issue a first digital currency token, wherein issuing is an off-chain exchange transferring the first denomination outside a digital currency ledger, and wherein issuing includes generating the first digital currency token including one or more metadata fields based on a reallocation of at least one digital currency token of a plurality of digital currency tokens stored on the digital currency ledger, wherein reallocation includes updating a token value of the at least one digital currency token on the digital currency ledger utilizing at least one public and private key pair. Further, the one or more computer-readable storage media having instructions stored thereon that, when executed by at least one processing circuit, cause the at least one processing circuit to generate an issuance identifier associated with the issuance request. Further, the one or more computer-readable storage media having instructions stored thereon that, when executed by at least one processing circuit, cause the at least one processing circuit to set the issuance identifier in an identifier field of the one or more metadata fields of the first digital currency token. Further, the one or more computer-readable storage media having instructions stored thereon that, when executed by at least one processing circuit, cause the at least one processing circuit to transmit, via the first private network, the first digital currency token to the digital wallet application.

Figure 1:
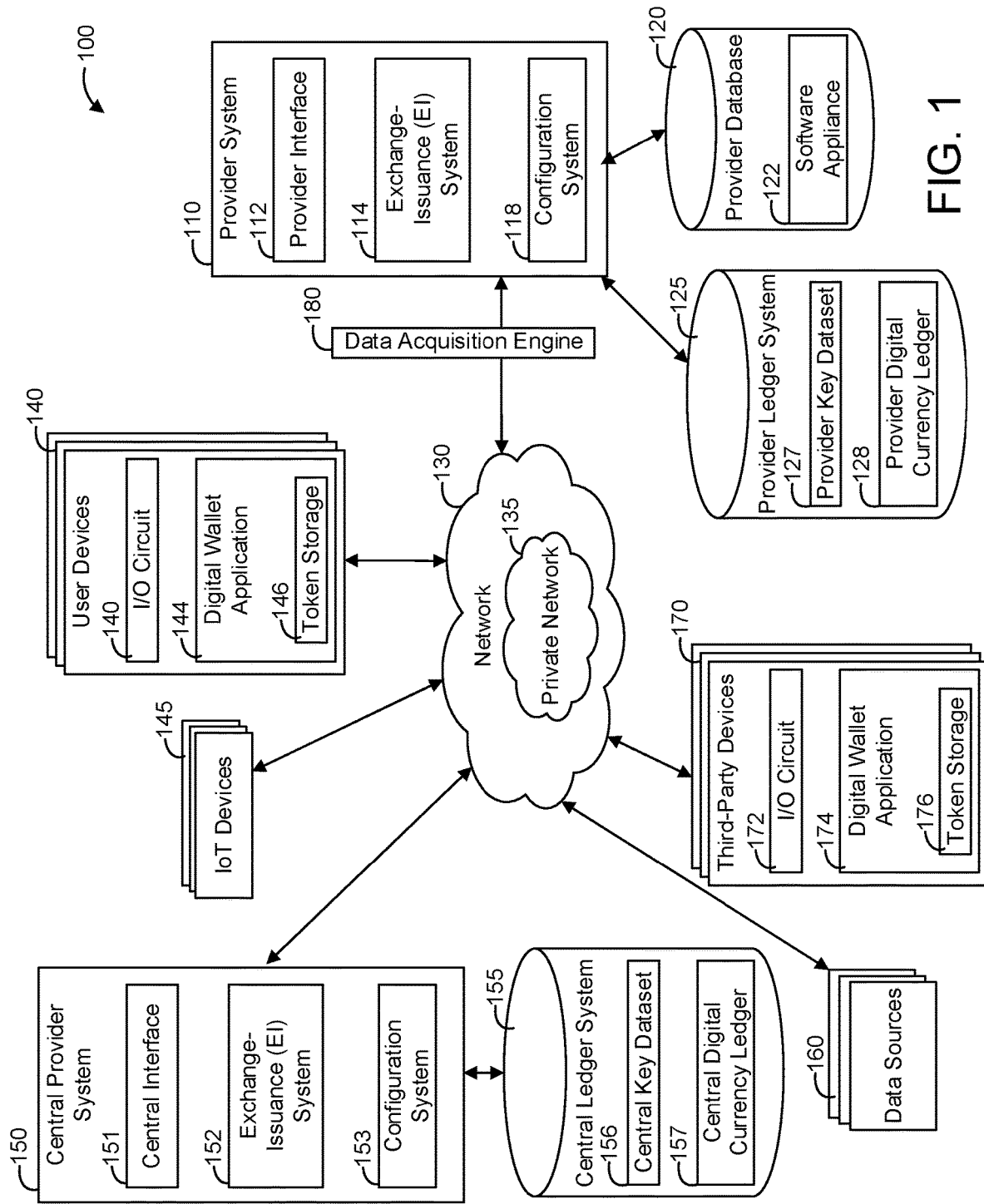
FIG. 1 is a block diagram depicting an implementation of a digital currency framework, according to some arrangements.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the FIGS., the systems and methods relate generally to issuing, protecting, and exchanging digital currency using a cryptocurrency distribution framework. In some arrangements, the causal framework can include one or more ledger networks and a plurality of digital wallets that can be hosted by one or more computing systems. In particular, the one or more ledger networks and the plurality of digital wallets can store digital currency (also referred to as "digital token," "digital asset," "digital money," "electronic money," or "electronic currency"), control the creation of additional digital currency, destroy digital currency, and verify the transfer of digital currency.

As used herein, a "digital currency" may be a data package or structure including information (e.g., values in fields) and an amount of digital currency that is owned by one or more parties (e.g., user, individual, institution, company, or so on) and used to perform exchanges (e.g., for goods or services) in a computer network environment (e.g., on a ledger, between digital wallets, and so on). The digital currency may be encrypted and decrypted using one or more public and private key pairs (sometimes referred to as a "verification and signing key pair"). In some arrangements, a digital currency may be a digital form of a fiat currency of one or more nations, one or more countries, or one or more regions. In some arrangements, the digital currency may be issued by a central provider (e.g., Federal Reserve System (FRS)), or by a specific provider (e.g., bank). The digital currency may be a CBDC or derived (for example, as a token) from a CBDC. In various arrangements, the digital currency can include information in one or more metadata fields that may be modified by the one or more parties. Furthermore, digital currency issuance, protection, and/or exchange can be performed via a private network connection between a digital wallet application (e.g., of a user device) and another computing system (e.g., central provider, provider, third-party, another digital wallet application, and so on).

Generally, digital currency (e.g., cryptocurrency, digital fiat currency) users can store their digital currency as tokens in digital wallet applications (e.g., provider-owned, user-owned), where the purchase, sale, and exchanges of the digital currency can occur in blocks. Each block connects to the previous block by means of a code, based on ledger technology. In some arrangements, digital currency is recorded on a ledger, which can be a shared ledger, a central ledger, or a document duplicated several times across a network of computers ("nodes"). In particular, exchanges that occur and the ownership of digital currency in circulation can be recorded in the ledger. As such, the nodes of the ledger or ledger network can prevent invalid exchanges from taking place. However, problems can arise when an individual or entity attempts to perform an exchange off-ledger (e.g., between a node and an off-ledger digital wallet application off-ledger, or between two off-ledger digital applications).

Furthermore, cryptocurrency is currently a two trillion-dollar market that continues to grow. However, cryptocurrency is mostly unregulated by federal government entities (e.g., Securities and Exchange Commission (SEC), commodity futures trading commission (CFTC), Department of Commerce (DOC)). In many systems, federal government entities across the globe face obstacles and difficulties in regulating the exchange of cryptocurrencies because exchanges are typically anonymous. In particular, digital currencies (e.g., cryptocurrency) are exchanged on ledger networks such that each exchange includes a destination address. The destination address is unique since each exchange on the ledger network can include a unique, single-use address that is provided to a sender to initiate an exchange. The design of the destination address provides protection and privacy to assets by removing the ability to link exchanges to each other. However, users and entities exploit this design in trying to avoid taxes and other regulations from federal government entities. Furthermore, these exchanges without oversight or regulations are not insured (e.g., by the Federal Deposit Insurance Corporation (FDIC), by a provider such as a bank or credit card company, or by an insurance company) and users and entities can be exploited (e.g., hacked, defrauded, deceived, tricked, and so on) without a remedy or recourse.

Moreover, exchanging and managing digital currency can be an obstacle to many individuals without professional or specialized knowledge in cryptocurrency and/or ledger technology. That is, unlike physical currency exchanges or a bank transfers (e.g., person-to-person (P2P) payment) digital currency exchanges and custodianship can present additional obstacles and impediments that results in many individuals foregoing the use of digital currency entirely. Additionally, bad actors that exploit the anonymity of cryptocurrency and ledger networks can also decrease digital currency security leading to dampened mainstream adoption and wary individuals and/or entities. Accordingly, the ability to perform off-ledger issuances (sometimes referred to herein as "private network issuance") of digital currency, such as issuing a digital currency to a digital wallet application outside a digital currency ledger (e.g., where the computer device with the installed digital wallet application is not a node on the digital currency ledger), provides providers and users enhanced access to digital currency while also improving security of issuances of digital currency. In particular, the causal design improves security of the devices storing digital currency wallets while also eliminating and/or reducing the processing load and increasing storage capacity to computing systems (e.g., provider computer systems, user devices, payment processing systems) when attempting to issue or exchange digital currency on and/or off a ledger network. Therefore, aspects of the present disclosure address problems in ledger technology and digital currency technology by providing significant improvement to a cryptocurrency distribution framework and interoperability across users, entities, and providers of digital currency.

Furthermore, while cryptocurrency is a two trillion-dollar market currency, many users and entities are presented with challenges in accepting and exchanging cryptocurrencies with products and/or services they may offer. Those challenges can include, but are not limited to, certainty in cryptocurrency, speculation, fluctuation, little benefit in accepting cryptocurrency, native value, and so on. Generally, cryptocurrency, such as Bitcoin, Ethereum, Dogecoin, and so on, are tied to a market value determined by supply and demand and, unlike stocks, can change anytime during the day or night (e.g., 24/7). The challenges arise because users or entities lack confidence in what the value will be in a few seconds, minutes, hours, or days.

For example, company ABC buys product X for $1,500 USD from supplier DFW and sells product X in company ABC's marketplace (e.g., in-store, online, and so on) to consumers for $1,750 USD. In this example, if company ABC accepts credit cards and cash, when a consumer buys product X for $1,750 USD with a credit card, company ABC will receive $1,750 USD. However, in this example, if company ABC also accepts Bitcoin, a customer may buy the product for an equivalent amount of USD in Bitcoin (e.g., 0.05 Bitcoin), but after (e.g., seconds or minutes later) company ABC accepts the equivalent amount of Bitcoin, the value may drop below $1,500. As shown, this type of example is why companies (e.g., such as company ABC) will not accept Bitcoin, as it can be uncertain, speculative, fluctuate greatly in a small period of time, and lacks a link to a native currency value (e.g., USD, EUR, CAD, GMP, JPY, and so on). Furthermore, this type of example is why consumers and companies will only accept cash, debit cards, credit cards, and/or check payments.

Additionally, payment processors of card payments are constantly verifying the accuracy of exchanges occurring online or in-person, which requires significant computer bandwidth and storage capacity by the payment processor computing systems. For example, on average in the United States there can be 108 million credit card transaction each day or 75 thousand transactions per minute. However, micro-payments (e.g., payment each second, payment each minute) by individuals using credit cards would significantly increase the requirements of computer bandwidth and storage capacity that would cause disruptions in payment processing and potentially overload the payment processing systems. Furthermore, digital currency transactions (e.g., utilizing a ledger such as a blockchain) can take minutes (e.g., 10 minutes) to be verified and signed. As such, the ability to perform micro-payments of digital currency in real-time (or near real-time) based on usage of a particular product or service provides providers and customers improved performance and enhanced flexibility in digital currency exchanges on and/or off ledger networks. This causal framework provides significant improvements to users and entities by allowing the exchange of digital currency in real-time while maintaining and reducing processing power and storage requirement when a payment is processed. Therefore, aspects of the present disclosure also address problems in ledger technology and payment processing technology by providing significant improvement to a cryptocurrency distribution framework and interoperability across systems (e.g., digital wallets and provider systems) that includes one or more digital currencies.

Moreover, in many systems, cryptocurrencies use decentralized control as opposed to centralized digital currency and central banking systems. The decentralized control of each cryptocurrency works through distributed ledger technology (DLT), such as a blockchain that serves as an electronic public financial transaction database. Oftentimes, decentralized control of cryptocurrency can invite and lead to hackers, criminals, and other parties requesting payment in cryptocurrency because it can be undetectable to investigators, law enforcement, and federal governments. Recently, cyber-incidents (e.g., data breaches, ransomware, cyberattacks (e.g., phishing attacks, malware attacks, web attacks, and artificial intelligence (AI)—powered attacks), and other detrimental cyber-incidents) have occurred and plagued various entities across the globe, and oftentimes the hackers request payment in decentralized cryptocurrency such as Bitcoin, Ethereum, Dogecoin, and so on. Many times, the cyber-incidents are publicized and entities' and/or users' sensitive data (e.g., deoxyribonucleic acid (DNA), social security numbers (SSN), passport numbers, financial account numbers, payment card industry (PCI) data, other personal identifying information, and so on) can be collected and broadcasted to the ledger (e.g., DLT) and/or internet, thereby exposing the sensitive data, and thus increasing the risk of additional cyber-incidents.

Accordingly, the ability to have centralized control of digital currency across one or more ledgers (e.g., centralized, provider, inter-provider, and so on), such as configuring digital currency nodes utilizing a one-tiered or two-tiered model, provides providers and individuals enhanced visibility and security into digital currency exchanges on and/or off ledger networks and to the sensitive data (e.g., public and private key pairs) stored on the devices and/or systems. This causal framework that sets up and maintains a software appliance or application on a computer system provides significant improvements to cybersecurity of providers and users by improving network security (e.g., establish private network connection for digital currency issuance), infrastructure security (e.g., parties may not attempt to exchange digital currency without configured computing device or system), technology security (e.g., eliminate decentralized data silos that are susceptible to cyber-incidents (i.e., reduce "attack surface")), and data security (e.g., digital currency centralization improves analytical reporting, data governance, maintenance). Thus, this causal framework enables users and entities to exchange digital currency while maintaining and protecting the sensitive data and the devices storing the digital currency. Therefore, aspects of the present disclosure also address problems in digital currency technology by configuring devices and system that exchange digital currency prior to enabling exchanging or receiving issuance from a computer system (e.g., central provider system).

Referring now to FIG. 1, a block diagram depicting an example of a cryptocurrency distribution framework 100 is shown, according to some arrangements. The cryptocurrency distribution framework 100 is shown to include a provider system 110, user devices 140, central provider system 150, data sources 160, and third-party devices 170. The plurality of devices and/or systems 110, 140, 150, 160, and/or 170, may initiate, collect, and/or route (e.g., provide) data over network 130 and/or private network 135. The data acquisition engine 180 may provide a single application programming interface (API) or multiple APIs to access various data generated, stored, or routed by devices and systems 110, 140, 150, 160, and/or 170.

In general, the one or more processing circuits can include a microprocessor, an application specific integrated circuit (ASIC), a field-programmable gate array (FPGA), and so on, or combinations thereof. A memory can include, but is not limited to, electronic, optical, magnetic, or any other storage or transmission device capable of providing processor with program instructions. Instructions can include code from any suitable computer programming language. The memory may also store parameter data to affect presentation of one or more resources, exchanges of one or more digital currencies, attributes of one or more digital currencies, and so on, on the computing devices and/or systems.

The one or more user devices 140 (e.g., smartphones, tablets, computers, etc.) may be used by a user to perform various actions and/or access various types of content (e.g., marketplace), some of which may be provided over a network 130 (e.g., the Internet, LAN, WAN, and so on) and/or private network 135 (e.g., the Internet, LAN, WAN, and so on, utilizing one or more security protocols, such as Internet Protocol Security (IPSec), Layer 2 Tunning Protocol (L2TP), Point-to-Point Tunneling Protocol (PPTP), Secure Shell (SSH), and so on). The term "user" as used herein may refer to an individual operating user device 140 interacting with resources or exchanges using digital currencies (e.g., at a point-of-sale (POS) device, online marketplace, wallet-to-wallet, issuer-to-wallet) via the user devices 140. The user devices 140 may be used to send data to the provider system 110, central provider system 150, or third-party devices 170, or may be used to access websites (e.g., using an internet browser), access applications (e.g., using a mobile application) such as digital wallet application 144 (sometime referred to as "mobile wallet application"), and/or any other types of content. In some implementations, the user devices 140 have enabled location services which can be tracked over network 130 and/or private network 135.

For example, a user may be a payor (or payee) of a digital currency exchange and may have a digital currency wallet (e.g., implemented in digital wallet application 144) stored on the user device 140 such that a source address (or destination address) (e.g., public key, hashed version of a public key) of the digital currency wallet can be provided to the provider system 110 for initiation of an exchange. In another example, a user may be a merchant that has one or more digital currency accounts (e.g., stored on provider ledger system 125 or on user device 140) and may receive and/or use digital currency facilitated (or managed) by the provider system 110 or by user device 140. In some arrangements, the GPS or other technologies may be used to determine a location of user devices 140.

The user device 140 (sometimes referred to herein as a "computing system") may be a mobile computing device, desktop computer, smartphone, tablet, smart watch, smart sensor, or any other device configured to facilitate receiving, displaying, and interacting with content (e.g., web pages, mobile applications, etc.) and configured to facilitate digital currency interactions (e.g., issuance, exchanges, destroying, storing). User device 140 may also include an input/output circuit 142 for communicating data over network 130 or private networks 135 to provider system 110, central provider system 150, and/or third-party devices 170. User device 140 may also include a digital wallet application for facilitating digital currency interactions and accessing digital currency.

In some arrangements, the one or more user devices 140 and/or internet of things (IoT) devices 145 can be configured to collect and provide activity data. As used herein, "activity data" may be any data collected in an environment of a user device 140 and/or IoT devices 145. In particular, an environment can include, but is not limited to, network or virtual environment, physical or natural environment, or social environment. The user device 140 and/or IoT device 145 can use one or more input devices to collect and aggregate the activity data into an environmental dataset. For example, network or virtual activity data can include, but is not limited to, internet usage, application usage (e.g., mobile application, online application), cellular usage (e.g., data usage), network packets, network addresses, interactions with other networks or devices, historical exchange data, smart contract execution, ledger information and activity, issuance information and activity, and so on. In another example, physical or natural environment data can include, but is not limited to, utilities usage (e.g., water, gas, electricity, energy), weather conditions, geographic locations (e.g., latitude and longitude, triangulation), transportation usage (e.g., car, plane, train, bus), and so on. In yet another example, social environment data can include, but is not limited to, social media usage (e.g., streaming service, phone or computer usage, Facebook™, Twitter™, Snapchat™, and TikTok™), streaming service usage, other service usages (e.g., digital newspaper provider usage, stock market services usage, grocery order usage), membership usage, reward card usage, news feed data (e.g., articles, breaking news, and television content), and so on.

The IoT devices 145 can be coupled to various environmental items or disposed in various locations within an environment (e.g., fixedly coupled to or within a pipe or water feed, fixedly coupled to or within an air duct, electrically coupled to an electrical feed, communicably coupled to a hardwired or wireless network feed or data feed, and so on) according to some embodiments. The IoT devices 145 can be configured within a network (e.g., wired or wireless network (e.g., public or private)), according to some embodiments. The IoT devices 145 can communicate with provider system 110, user devices 140, central provider system 150, and/or third-party devices 170 through the network (e.g., 130 and 135). The IoT devices 145 can provider activity data to the various systems or devices described herein for determining and/or calculating various activity (e.g., usage, location, access, environment, and so on). For example, a modem (e.g., IoT device 145) could connect to the user device 140 or provider system 110 via network 130 and provide network usage information such as megabytes or gigabytes used and the particular application or service associated with the usage. In another example, a flow sensor (e.g., IoT device 145) coupled to a water pipe within the house (e.g., toilet, water shutoff, sink, dish washer, washer, and so on) could connect to the provider system 110 via network 130 and provide water usage information such as gallons of water used and the particular item (e.g., toilet, sink) or area (e.g., house, floor, bathroom, business) use. In various implementations, the IoT devices 145 can be new or potentially legacy IoT devices that are already in the environment such the existing infrastructure can be utilized. In some arrangements, the IoT device 145 can store various information such as user information or data (e.g., based on an interaction with a user, such as the owner or user of the IoT device), network information (e.g., IP address, what devices have communicated with it), location data or information (e.g., geographic location), activity data, and so on. In particular, the IoT device 145 may be communicably coupled with a user device 140 such that it can receive, collect, and exchange data stored on the user device 140.

The IoT devices 145 can include, but are not limited to, any or all user mobile devices (phones, GPS devices, such as user device 140), acoustic sensor, flow sensor, network usage device, infrared (IR) counter sensors, cameras (e.g., of any wavelength and including low resolution cameras, high resolution cameras, infrared, etc.), radio-frequency identification (RFID) sensors, Bluetooth™ low energy (BLE) beacon sensors, fire sensors, IP microphones, decibel meter, carbon monoxide (CO) sensors, Geiger counter sensors, seismometers, barometers, relays, door sensors, window sensors, any suitable commercial or residential security sensors, any suitable weather sensors, any suitable natural disaster sensors, Wi-Fi™ triangulation sensors, ultra-wideband arrays (UWB), geolocation sensors, RFID sensors, a desktop computer, a laptop or notepad computer, a mobile device such as a tablet or electronic pad, a personal digital assistant, a smart phone, a video gaming device, a television or television auxiliary box (also known as a set-top box), a kiosk, a hosted virtual desktop, or any other such device capable of exchanging information via the network 130. The provider system 110 and/or any other device or system describes herein can use a combination of different types of IoT devices 145 connected to a network (or outside a network) (e.g., network 130 or 135) to track activity data, according to some embodiments. In this way, the provider system 110 and/or any other device or system can determine activity (e.g., of the user or group of users) with higher precision, higher location accuracies, customized activity-specific responses, lower latency, and lower bandwidth consumption, according to some embodiments.

The one or more data sources 160 may include data collected by the provider system 110, user devices 140, IoT devices 145, central provider system 150, and/or third-party devices 170 by receiving exchange data (e.g., transactions, digital currency tokens, public keys, public and private key pairs, point-of-sale communications, wallet communications, ledger communications), activity data (e.g., from IoT devices 145 and/or user devices 140), from the plurality of devices and/or systems 110, 140, 145, 150, and/or 170. The data may be attributes for particular digital currency or tokens, or exchange and/or activity information at one or more points in time. The data may be data for particular entities, third parties, or users (e.g., patients, customer transactions, internet ads, conditions, ledger addresses) at one or more points in time. The data collected may associated with a plurality of entities, a plurality of users, a plurality of providers, a specific entity, a specific user, a specific provider, and so on. In some embodiments, the data sources 160 can include various data aggregating systems (e.g., entities that collect activity data, such as from utility provider, gig-economy application or system, or any other system generating activity data associated with a user or provider). The provider system 110 can receive environmental data from the data sources 160 via the network 130. This information may be stored as environmental data in the provider database 120.

The one or more third-party devices 170 may be used by a third party with a relationship to a provider (e.g., vendor, customer, individual, entity, supplier, and so on) to perform various actions and/or access various types of data, some of which may be provided over network 130 and/or network 135. The term "third party" as used herein may refer to an individual operating one or more third-party devices 170 interacting with resources or data via the third-party devices 170. The third-party devices 170 may be used to electronically transmit data (e.g., issuance requests, exchange requests, tokens, public and private keys, activity data, network information) to the provider system 110 or any other system and/or device described herein, to access websites (e.g., using a browser), the internet (e.g., using a mobile application), supply services, supply products, and to receive and/or transmit any other types of data. In some arrangements, third-party devices 170 can be configured to collect and provide exchange data and activity data to the provider system 110. In various arrangements, the third-party devices 170 may also be used to electronically transmit data to the user devices 140 and central provider system 150, and can be configured to receive and/or transmit any other types of data. For example, a third party may be a payee of a digital currency exchange and may have a digital currency application 174 stored on the third-party device 170 such that a destination address of the digital currency wallet can be provided to the provider system 110 or user device 140 for initiation of an exchange. In another example, a third party may be a gig-economy provider (e.g., on-demand services and goods) that has one or more digital currency accounts (e.g., stored on third-party device 170) and may receive digital currency tokens from customer digital currency wallets (e.g., digital wallet application 114).

The third-party device 170 (sometimes referred to herein as a "computing system") may be a mobile computing device, desktop computer, smartphone, tablet, smart watch, smart sensor, or any other device configured to facilitate receiving, displaying, and interacting with content (e.g., web pages, mobile applications, etc.). Third-party device 170 may also include an input/output circuit 172 for communicating data over network 130 and/or private network 135. For example, the third-party devices can receive and transmit exchange data (e.g., transactions, digital currency tokens, public keys, public and private key pairs, point-of-sale communications, wallet communications, ledger communications), activity data (e.g., from IoT devices 145 and/or user devices 140) to provider system 110, user devices 140, IoT devices 145, and/or central provider system 150.

The input/output circuits (e.g., 142, 172) of user devices 140 and third-party devices 170 can be structured to send and receive communications over network 130 (e.g., with provider system 110). The input/output circuit is structured to exchange data (e.g., public and private key pairs, tokens, activity data, and so on), communications, instructions, and so on, with an input/output components of the various systems and devices described herein (e.g., central interface 151, provider interface 112, data sources 160). In one arrangement, the input/output circuit can include communication circuitry for facilitating the exchange of data, values, messages, and the like between the input/output circuit (e.g., 142, 172) and the provider system 110 and/or central provider system 150. In yet another arrangement, the input/output circuits can include machine-readable media for facilitating the exchange of information between the input/output circuits and the provider system 110. In yet another arrangement, the input/output circuits can include any combination of hardware components, communication circuitry, and machine-readable media.

In some arrangements, the input/output circuits of various devices and systems (e.g., 142, 172) describe herein can include suitable input/output ports and/or use an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output circuits may provide an interface for the user to interact with various applications and interfaces (e.g., provider interface 112, central interface 151). For example, the input/output circuits of third-party devices 170 and/or user devices 140 include a keyboard, a keypad, a mouse, joystick, a touch screen, a microphone, a haptic sensor, a car sensor, an IoT sensor, a biometric sensor, an accelerometer sensor, a virtual reality headset, smart glasses, a smart headset, and the like. As another example, input/output circuits (e.g., 142, 172), may include, but is not limited to, a television monitor, a computer monitor, a printer, a facsimile machine, a speaker, and so on. As used herein, virtual reality, augmented reality, and mixed reality may each be used interchangeably yet refer to any kind of extended reality, including virtual reality, augmented reality, and mixed reality.

Additionally, the input/output circuits (e.g., 142, 172) can include, without limitation, input devices such as keyboards, touch screens, touchpads (e.g., electromagnetic induction pads, electrostatic pads, capacitive pads, etc.), microphones, joysticks, foot pedals, Inertial Measurement Units (IMUs), accelerometers, gyroscopes, tilt-sensors, motion sensors, environmental sensors, Musical Instrument Digital Interface (MIDI) input devices such as MIDI instruments (e.g., MIDI keyboards), styluses, pointing devices such as a mouse or trackball, and so on. Output devices can include, without limitation, video displays, speakers, haptic feedback devices, refreshable Braille terminals, lights, servos, and so on.

In various arrangements, input/output circuits (e.g., 142, 172) can transmit data periodically (e.g., activity data, exchange data, token information, ledger information, public and/or private keys). For example, input/output circuits may transmit data at a predefined time. As another example, input/output circuits may transmit data on an interval (e.g., every ten minutes, every ten hours, etc.). Additionally or alternatively, input/output circuits may transmit data in response to a threshold (e.g., within a certain geolocation, spent a specified amount of digital currency, when powered on, during the use a gig-economy service, during utility usage, and so on). For example, input/output circuits may transmit data in response to receiving a software package, downloading a digital wallet application, registering an IoT device 145 with a digital wallet application stored on the user device 140, and so on. In some arrangements, input/output circuits may transmit data dynamically. For example, input/output circuits may transmit data in response to user devices 140 being connected to a charging source or within a specific geolocation area. As a further example, input/output circuit may transmit data in response to transmitting an issuance request (e.g., for a denomination of digital currency).

Third-party devices 170 and user devices 140 may also include a digital wallet application (e.g., 144, 174) (also referred to herein as a mobile client application and/or provider institution client application). It should be understood that the digital wallet application 174 and token storage 176, of third-party device 170 can include similar features and functionality as the digital wallet application 144 and token storage 146 of user device 140 respectively. In some embodiments, the digital wallet application 144 is a mobile wallet configured to store various digital currency data in token storage 146 such as, but not limited to, digital currency tokens, key datasets (e.g., public and private key pairs), a blockchain or ledger, wallet address information, and so on. Thus, the digital wallet application 144 may be provided by, coupled to (e.g., communicably), and supported by, at least partially, the provider system 110 and/or central provider system 150. In some arrangements, the digital wallet application 144 may be a standalone application or be incorporated with an existing application of the user device 140 (e.g., integrated into a mobile banking application, a service provider application, etc.). It should be understood that the user devices 140 and third-party devices 170 may store a plurality of digital wallet applications on the device such that payments using digital currency tokens can be made using one of the plurality of digital wallet applications. In particular, a digital wallet application may be used for different purposes and as such, each digital wallet application of a plurality of digital wallet applications may be used to exchange digital currency.

In some arrangements, the digital wallet application 144 may be downloaded by the user device 140 prior to its usage, hard coded into a memory of the user device 140, or be a network-based or web-based interface application such that the provider system 110 or central provider system 150 may provide a web browser to access the application, which may be executed remotely from the user device 140. In the example shown, the digital wallet application 144 is downloaded to the user device 140 and provided by the central provider system 150 via, for example, an app store for download. In the example shown, the digital wallet application 144 is structured as a digital currency exchange application and may be referred to as such herein. The digital wallet application 144 may be developed and maintained (e.g., provided with software updates on a regular or semi-regular basis) by the central provider via the central provider system 150 or by the provider via the provider system 110. Accordingly, the user device 140 may include software and/or hardware capable of implementing a network-based or web-based application. For example, in some instances, the mobile application 142 includes software such as HTML, XML, WML, SGML, PHP (Hypertext Preprocessor), CGI, and like languages. Additional information regarding installing the digital wallet application 144 are described in detail below with reference to FIGS. 3-4.

In the latter web-based instance, the user may have to log onto or access the web-based interface before usage of the application. Further, and in this regard, the digital wallet application 144 may be supported by the central provider system 150 via one or more servers, processors, network interface circuits, and so on, that transmit applications for use to the user device 140. Furthermore, prior to use of the digital wallet application 144 and/or at various points throughout the use of the digital wallet application 144, the user may be required to provide various authentication information or log-in credentials (e.g., a password, a pass code, a personal identification number (PIN), a fingerprint scan, a retinal scan, a voice sample, a face scan, any other type of biometric security scan) to ensure that the user associated with the user device 140 is authorized to use the digital wallet application 144.

As shown and as indicated above, the digital wallet application 144 includes a token storage 146. The token storage 146 is structured as a repository (e.g., a file in the digital wallet application 144 for storing certain information, instructions in the digital wallet application 144 for storing certain information in a memory device of the user device 140, etc.) that may store or hold digital currency data. Furthermore, token storage 146 may include an API configured for communication with the plurality of systems and devices described herein (e.g., 110, 145, 150, 160, 170). In another example, the token storage 146 may include an SDK that includes an API, a debugger, and IDE, and so on. In some implementations, token storage 146 includes one or more libraries having reusable functions that interface with a particular system software (e.g., iOS, Android, Linux, etc.). Token storage 146 may facilitate embedding functionality in digital wallet application 144. For example, a customer may use one or more digital currency tokens stored in token storage 146 to make a digital currency exchange (e.g., via a private connection on the private network 135) with a third-party device 170. In yet another example, an individual may use address information and public and private key information stored in token storage 146 to register an IoT device 145 with the digital wallet application 144. In yet another example, an individual may use a wallet address stored in token storage 146 to transmit an issuance request to provider system 110 or central provider system 150. Additional details regarding the functionality of the digital wallet application 144 and token storage 146 are described in detail below with reference to FIGS. 3-4.

The network 130 may include any combination of a wired and/or wireless network. Therefore, the network 130 local area network (LAN), a wide area network (WAN) (e.g., the Internet), a telephone network, such as the Public Switched Telephone Network (PSTN), a wireless link, an intranet, the Internet, a proprietary banking network, or combinations thereof. The network 130 can enable communication between various nodes, such as, but not limited to, user device 140 and central provider system 150, user device 140 and provider system 110, user device 140 and third-party device 170, user device 140 and IoT devices 145, and/or provider system 100 and central provider system 150. In some arrangements, data flows through the network 130 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 130 layered over an OSI layer-3 network protocol such as Internet Protocol (IP), e.g., IPv4 or IPv6. The network 130 may include various network devices (nodes) communicatively linked to form one or more data communication paths between participating devices. Each networked device include at least one network interface for receiving and/or transmitting data, typically as one or more data packets. An illustrative network 130 is the Internet; however, other networks may be used. The network 130 may be an autonomous system (AS), i.e., a network that is operated under a consistent unified routing policy (or at least appears to from outside the AS network) and is generally managed by a single administrative entity (e.g., a system operator, administrator, or administrative group).

Network 130 can also include a private network 135 (sometimes referred to as a "digital wallet network" in the digital wallet context). The private network 135 may be a private subnetwork (e.g., private subnet) of network 130. Network 130 can include a plurality of subnetworks (or subnets) and one or more of the plurality of subnetworks can be a private network 135. As such, network 130 can include a plurality of private networks 135. In some embodiments, the private network 135 can be used by the various systems and devices described herein (e.g., 110, 140, 145, 150, 160, 170) to exchange information (e.g., activity data, exchange data, token information, public and/or private keys) via a private network connection. In particular, private network 135 may limit access based on one or more requirements, such as, but not limited to, system requirements (e.g., software, hardware) of the device or system, location requirements, network requirements, and so on. In some arrangements, the private network 135 may be managed by central provider system 150 such that the central provider system 150 manages access to the private network 135. In various arrangements, prior to allowing (or enabling) a device or system to communicate via a private network connection, the device or system may be configured to meet one or more requirements (sometimes referred to herein as "hardened"). As such, the devices or systems described herein may be hardened prior to given access to communicate via the private network 135. In some embodiments, private networks 135 can be a plurality of virtual private networks (VPNs) without a publicly accessible endpoint or internet routable internet protocol (IP) address. Furthermore, each device or system connected to a virtual private network may be assigned a private IP address unique to the device or system. In some arrangements, each device or system connected to or on private network 135 can be a node on a blockchain or ledger.

Accordingly, the central provider system 150 may provide access (e.g., read, write, read/write) to private network 135 to a limited number of users and/or entities to improve security. For example, instead of using network 130, provider system 110 and central provider system 150 (or user device 140 and central provider system 150) may communicate (e.g., transmit, receive, collect, etc.) data (e.g., exchange data, activity data) using a private network connected with dedicated network connection to each provider (e.g., 110, 150). In various arrangements, the private network may be implemented based on a private network protocol such as Internet Protocol Security (IPSec), Layer 2 Tunneling Protocol (L2TP), Point-to-Point Tunneling Protocol (PPTP), Secure Shell (SSH), and so on. In some arrangements, each dedicated network connection may provide systems and devices described herein a private IPV4 address and/or a private IPV6 address. Additionally, all communications over the private network 135 connection can be encrypted with one or more secure network protocols (e.g., Secure Shell (SSL), Kerberos, IPSec, Secure Sockets Layer (SSL), Hypertext Transfer Protocol Secure (HTTPS), and so on) implemented utilizing a cryptographic function (e.g., symmetric encryption, asymmetric encryption, hashing, and so on). For example, the cryptographic function could be a homomorphic encryption function. In other examples, the cryptographic function could be any symmetric encryption function (e.g., Triple Data Encryption Standard (TDES), RCS, Advanced Encryption Standard (AES), Blowfish, CAST, and so on), and/or asymmetric encryption function (e.g. Rivest—Shamir—Adleman (RSA), Efficient and Compact Subgroup Trace Representation (ECSTR or XTR), Digital Secure, Escrowed Encryption Standard (EES), and so on). Additional details regarding hardening of devices or systems and providing access to the private network 135 are described in detail with reference to FIGS. 3-4.

The computing environment 100 can include a data acquisition engine 180. In various arrangements, the provider system 110 can be communicatively and operatively coupled to the data acquisition engine 180. The data acquisition engine 180 can include one or more processing circuits configured to execute various instructions. In various arrangements, the data acquisition engine 180 can be configured to facilitate communication (e.g., via network 130 or private network 135) between the provider system 110, the provider database 120, the provider ledger system 125 and systems and devices described herein (e.g., user devices 140, IoT devices 145, central provider system 150, data sources 160, third-party devices 170). The facilitation of communication can be implemented as an application programming interface (API) (e.g., REST API, Web API, or customized API), batch files, SDK, and/or queries. In various arrangements, the data acquisition engine 180 can also be configured to control access to resources of the provider system 110, provider database 120, and provider ledger system 125.

One or more APIs can be used by the data acquisition engine 180 and/or computing systems to exchange data and make function calls in a structured format. The API may be configured to specify an appropriate communication protocol using a suitable electronic data interchange (EDI) standard or technology. The EDI standard (e.g., messaging standard and/or supporting technology) may include any of an SQL data set, a protocol buffer message stream, an instantiated class implemented in a suitable object-oriented programming language, an XML file, a text file, an Excel file, a web service message in a suitable web service message format (e.g., representational state transfer (REST), simple object access protocol (SOAP), web service definition language (WSDL), JavaScript object notation (JSON), or XML remote procedure call (XML RPC)). As such, EDI messages may be implemented in any of the above or using another suitable technology.

The provider system 110 may include one or more systems (e.g., computer-readable instructions executable by a processor) and/or circuits (e.g., ASICs, Processor Memory combinations, logic circuits, etc.) configured to perform various functions of the provider system 110. In some arrangements, the systems may be or include a provider interface 112, an exchange-issuance (EI) system 114 (collectively referred to hereafter as the "EI system 114"), and a configuration system 116. It should be understood that various implementations may include more, fewer, or different systems than illustrated in FIG. 1, and all such modifications are contemplated within the scope of the present disclosure.

Referring to the interfaces described herein generally (e.g., 112 and 151). Each interface can be configured to receive, collect, or detect a plurality of data (e.g., activity data, exchange data, central provider data, ledger data) from a plurality of data sources (e.g., provider database 120, provider ledger system 125, user devices 140, IoT devices 145, central provider system 150, central ledger system 155, data sources 160, and third-party devices 170) via one or more data channels (e.g., over network 130 or private network 135). Each data channel may include a network connection (e.g., wired, wireless, cloud) between the data sources and the system (e.g., 110, 150). The plurality of data can include, but is not limited to, activity data (e.g., usage of one or more goods or services, user device usage, such as location changes based on a geolocation or digital wallet application usage, and so on), exchange data (e.g., token information, public and private key pairs, address information (e.g., source or destination), ledger information, denomination, and so on), central provider data (e.g., digital currency addresses on central digital currency ledger 157, public and/or private keys of the central key dataset 156, digital currency of central digital currency ledger 157, and so on), ledger data (e.g., digital currency addresses on provider digital currency ledger 128, public and/or private keys of the provider key dataset 127, digital currency of provider digital currency ledger 128, and so on).

As used herein, "digital currency tokens" (sometimes referred to as "coins" or "altcoins") can be a data packaged created and distributed by a provider from a ledger with one or more metadata fields (e.g., central provider from a central ledger, described below in detail with reference to central provider system 150). That is, the digital currency token can allow entities and users to issue and exchange digital currency (e.g., cryptocurrency) that can be stored on a plurality of blockchains and/or in individual wallets. Additionally the digital currency tokens can utilize cryptographic signatures based on public and private key pairs when an issuance or exchange occurs. For example, the digital currency token can be digitally signed by the sender utilizing a private key and/or exchange data (e.g., source and destination address, metadata, and so on). In various arrangements, the smart contracts can be executed to perform a specific set of instructions based on the type of action occurring with the digital currency token (e.g., issuing, exchanging, modifying, and so on). For example, a smart contract can be self-executed by a processing circuit described herein (e.g., central provider system 150, user devices 140, and so on) to perform various actions such as, but not limited to, digitally signing or verifying a digital currency token, increasing or decreasing a value of the digital currency token, modifying a metadata field, and so on. Smart contracts and the exchange of digital assets such as digital currency tokens are described with further reference to U.S. patent application Ser. No. 17/528,352, filed Nov. 17, 2021, the entire disclosure of which is incorporated by reference herein.

In some arrangements, the digital currency token can have one or more values and/or metadata that can be changed (e.g., increased, decreased, destroyed, modified, and so on). As such, the digital currency token can be for a specific use or may be used for a plurality of uses. For example, the digital currency token may be a token that has a digital value (e.g., CBDC, digital fiat currency) that can be changed (e.g., increased, decreased, destroyed) and can have a metadata field identifier identifying the issuer of the digital currency token. In another example, the digital currency token may be associated with a reward program of a business and can be accumulated over time as the holder of the digital currency token interacts with the business (e.g., makes purchases, uses a service, and so on). In yet another example, the digital currency token can be a governance token giving the holder of the digital currency token voting rights (e.g., election voting, board of directors voting, any other decision voted on by a group of people). In yet another example, the digital currency token may be a non-fungible token (NFT) that denotes ownership (or partial ownership) of a digital asset. Digital asset exchanges, manipulation, and uses are described with further reference to U.S. patent application Ser. No. 17/528,352, filed Nov. 17, 2021, the entire disclosure of which is incorporated by reference herein. In various arrangements, the digital currency token may include all or some of the functionalities of the examples described above (e.g., can have a digital value, can be associated with a reward program, can have voting rights, and/or can denote ownership of a digital asset).

For example, the provider interface 112 could receive central ledger data (e.g., stored on central ledger system 155) from the central provider system 150 including a digital currency token and a public key (or public and private key pair) associated with a virtual US dollar denomination (e.g., CBDC), an issuance identifier, a banknote identifier, and one or more authorization rules. In the above example, the received central ledger data (e.g., digital currency) can be modified by the provider system 110 to include various additional metadata fields and/or authorization rules. Alternatively, exchange system 114 may generate a new digital currency token that mirrors the digital currency token but also includes additional metadata fields and/or authorization rules, and in turn, the digital currency token from the central ledger data may be destroyed. Upon destruction or amending the digital currency token, the central provider system 150 may be notified (e.g., notification sent over network 130 or private network 135) that the digital currency token received from the central ledger data has been transferred.

Furthermore, in general, each interface can be configured to receive requests (e.g., issuance requests, exchange requests) from a plurality of systems and devices described herein (e.g., provider ledger system 125, user devices 140, central provider system 150, central ledger system 154, data sources 160, third-party devices 170) via one or more data channels (e.g., over network 130 and/or private network 135). Each data channel may include a network connection (e.g., wired, wireless, cloud) between the data sources and the system (e.g., 110, 150). The requests can be to issue digital currency (on or off ledger) and/or exchange digital currency. In some arrangements, the interfaces (e.g., 128, 157) can utilize a private ledger (e.g., centralized) that can be managed by each interface and can limit access to updating and modifying the private ledger.

For example, upon receiving a request for issuance (e.g., execute an exchange from the central digital currency ledger 158 to the provider digital currency ledger 128 or digital wallet application 144 of user device 140) the central interface 151 can cross-reference the central key dataset 157 to identify public keys and private keys associated with one or more digital currency tokens to exchange on the central digital currency ledger 158.

Moreover, the central interface 151 upon identifying public keys of one or more digital currency tokens, can sign the one or more digital currency tokens using one or more identified private keys and transmit the one or more digital currency tokens with a public key to the provider system 110 (e.g., in particular provider interface 112) or user device 140 (e.g., in particular digital wallet application 144). In particular, signing using the private key can include hashing (e.g., SHA1, MD5, etc.) the digital currency token and verifying using the public key can include decrypting the digital currency token using the public key to verify the digital signature came from the particular private key. In some arrangements, the keys may be symmetric (e.g., use the same key to sign/verify) or asymmetric (e.g., use different keys to sign/verify). For example, an algorithm (e.g., such as a hash algorithm) can be applied to a private key to generate a public key. Accordingly, public keys can be a cryptographic code that allows users and system described herein to receive digital currency tokens and verify them prior to amending and/or updating a ledger (e.g., 128, 146, 157, 176). In some arrangements, token storage 146 and 176 can include a ledger for storing one or more digital currency tokens and can include similar features and functionalities of provider digital currency ledger 128 and central digital currency ledger 157.

In some arrangements, the private network connections (e.g., data channels) of private network 135 can be between a source address on a source ledger and a destination address on a destination ledger, such that receivals or transmissions of a digital currency tokens occur between the addresses on the ledgers. An address can be generated based on executing, by the exchange system 114, a math-based function (e.g., hash, symmetric encryption, asymmetric encryption) on a public key of a public and private key pair (or a verification key of a verification and signing key pair). For example, if an provider interface 112 receives a digital currency token or ledger data from any system or device described herein, the digital currency token or ledger data may be associated with a source address, and the provider interface 112 may determine a destination address (e.g., may be provided to the system sending the digital currency token or ledger data in advance) to store the digital currency token or ledger data in the provider digital currency ledger 128. In yet another example, if the central interface 151 receives digital currency tokens from any system or device described herein, the digital currency tokens may be associated with a source address (e.g., on or off ledger), and the central interface 151 may determine a destination address to store the digital currency token in the central digital currency ledger 157. In various arrangements, the addresses may be a unique sequence of randomized (or pseudo-randomized) numerical digits, characters, punctuation, whitespace, code (e.g., QR), or symbols.

Referring now to the EI system (i.e., exchange-issuance system) described herein generally (e.g., 114 and 152, for simplification referred to hereafter as EI system 114). Each EI system can also be configured to generate public and private key pairs and provide public keys (e.g., or public and private key pairs) to one or more computing devices (e.g., provider system 110, user devices 140, central provider system 150, and/or third-party devices 170) for use in a digital currency exchange and/or issuance. That is, the EI system 114 can interface (e.g., using an API) with one or more ledger systems (e.g., 125, 155) or digital wallets (e.g., 144, 174). In various arrangements, the public and private key pair can be generated based on a cryptographic function (e.g., symmetric-key algorithms (such as DES, AES), asymmetric-key algorithms (Ed25519 signing, ECC), public-key algorithms (such as RSA), and so on) and be stored in the respective key datasets (e.g., 127, 156) and/or token storage (e.g., 146, 176). In some arrangements, each ledger system (e.g., 125, 155) and digital wallets (e.g., 144, 174) can maintain (e.g., store and access keys) a key dataset such that each digital currency token may be associated with a public/private key pair stored on the key dataset. Each public/private key pair can shared amongst a plurality of digital currency tokens or can be unique to each digital currency token on or off the ledger.

In various arrangements, the sender (e.g., a source party such as a user, provider, or entity) can utilize its private key to generate a digital signature. The process of signing the digital currency token can include executing a mathematical operation that can only be performed by the device (e.g., 110, 140, 150, 170) of the sender who possesses the private key. The digital currency token and the digital signature can then be sent to a recipient. As will be appreciated, the recipient (e.g., destination party) can be a user, provider, and/or entity that can use the digital signature and the senders public key to verify that the sender is the signer of the digital currency token and that the integrity and origin authenticity of the digital currency token has not been compromised. In some arrangements, one or more digital currency tokens on a ledger (e.g., 128, 158) or off a ledger (e.g., stored in token storage 146 and 176) may be associated with an issuer (e.g., designated in a metadata field such as an identifier field) and an account or wallet (e.g., designated in a metadata field such as an account field or wallet field).

In one example, the central provider system 150 may receive an issuance request for a denomination of digital currency from a user device 140, in particular, the digital wallet application 144. The user device 140 may have an account with the central provider system 150. In the following example, the central provider system 150 may issue the denomination of digital currency via a digital currency token that includes one or more metadata fields. In this example, the central provider system 150 may embed or set an identifier field with an issuance identifier (e.g., US CENTRAL BANK, USCB) identifying the issuer of the digital currency token. Further in this example, the central provider system 150 may in turn destroy or update the central ledger system 155 (e.g., destroy the key, update the blockchain) including the central key dataset 156 and/or central digital currency ledger 157. In some arrangements, when digital currency tokens are transferred between ledgers (e.g., 125, 155) and/or wallets (e.g., 144, 176) the digital currency token on the senders ledger or wallet may be voided since the public/private key pair would be invalid (e.g., cannot be used to sign or verify an exchange). That is, while the ledgers may not destroy or update the digital currency token when they are transferred to different ledgers or wallets the digital currency token on the senders ledger or wallet would be unusable or unvalued.

In another example, the central provider system 150 may receive an issuance request for a denomination of digital currency from a provider system 110, in particular, the EI system 114. The EI system 114 may have an account with the central provider system 150. In the following example, the central provider system 150 may issue the denomination of digital currency via a digital currency token that includes one or more metadata fields. In this example, the central provider system 150 may embed or set an identifier field with an issuance identifier (e.g., US CENTRAL BANK, USCB) identifying the issuer of the digital currency token. Further in this example, the central provider system 150 may in turn destroy or update the central ledger system 155 (e.g., destroy the key, update the blockchain) including the central key dataset 156 and/or central digital currency ledger 157.

The EI system 114 (and EI system 152) can be configured to generate various data structures stored in the provider ledger system 125, provider database 120 (or EI system 152's respective connected systems). For example, the EI system 114 can be configured to generate one or more digital currency tokens. The digital currency tokens may be a data structure including one or more metadata fields (sometimes referred to herein as "fields") and can be stored on the provider digital currency ledger 125. In generating a digital currency token, a public and private key pair can be generated that can be unique to the digital currency token. The EI system 114 can store the generated public and private key pairs in the provider key dataset 127.

In various arrangements, the EI system 114 (and EI system 152) can also be configured to receive data that can be used in performing exchanges, issuances, and/or updating digital currency tokens. For example, EI system 114 can be configured to receive activity data from one or more systems and/or devices described herein (e.g., user device 140, IoT device 145). In the following example, the received activity data may be analyzed to determine if a payment should allocated (or paid) in real-time (or near real-time) based on the activity to a third-party digital wallet, in particular digital wallet application 174 of third-party device 170 (e.g., utility company, gig-economy service, pending exchanges, any other goods or service provider). In another example, EI system 152 (or 114) can be configured to receive issuance requests for an off-ledger exchange transferring a denotation of a first digital currency outside the central digital currency ledger 157. In the following example, EI system 152 can issue one or more digital currency tokens based on generating a new digital currency token including one or more metadata fields (e.g., identifier field) and transmitting the digital currency token (or a public or private key) to a digital wallet application (e.g., 144, 174).

The provider interface 112 and/or central interface 151 can further be configured to retrieve and analyze activity data from the systems and devices described herein, including actions or use performed by user devices 140 and/or IoT devices 145. In some implementations, each provider interface 112 retrieves user activity data (e.g., from an electricity meter, from a gig-economy phone application, from a third-party, from a subscription service (e.g., 170), from a user device indicating network usage, and so on) and create an activity log with one or more log entries. The activity log can span over any specified time period (e.g., past month, past week, etc.) and can be specific to a user based on any constraints (e.g., type of activity, location of activity, and so on). The provider interface 112 may be configured to use a filtered activity log in order to determine if one or more digital currency tokens should be issued to a third-party based on a rule dataset. In particular, a digital currency token may be assigned to a third-party digital wallet address of a third-party digital wallet application 174 based on a rule dataset (e.g., for each 1 GB of data used then issue a specified amount of digital currency, for each kilowatt hour of electricity used then issue a specified amount of digital currency, for each mile traveled then issue a specified amount of digital currency, and so on).

The provider interface 112 and/or EI system 114 can also be configured to query the provider database 120 and provider ledger system 125. In various arrangements, the provider database 120 includes various transitory and/or non-transitory storage media. The storage media may include magnetic storage, optical storage, flash storage, and RAM. The provider database 120 and/or the provider system 110 can use various APIs to perform database functions (e.g., managing data stored in the provider database 120). The APIs can include SQL, NoSQL, NewSQL, ODBC, and/or JDBC components. The provider database 120 can also store a software appliance 122.

In some arrangements, the software appliance 122 can be a software application that may be combined with or run on an operating system for the software appliance to be executed on different industrial standard hardware (e.g., a computer such as provider system 110, a server). The software appliance 122 can be generated and configured at one machine (e.g., in the form of an image stored in a DVD, USB, or another storage device) and then installed at another machine. In various arrangements, the software appliance 122 can be installed over a network (e.g., 130 or 135). In some arrangements, software appliance 122 can be generated using a computing device or a server (e.g., via central provider system 150). For example, the central provider system 150 can package a software stack (e.g., a software application, a system) and any of its required dependencies (e.g., an underlying database) into a software appliance 122 in the form of an image. The software appliance 122 can run on various operating systems, such as Windows®, Linux®, or UNIX® operating systems. To deliver and install the software appliance to another machine, such as a virtual server in a cloud computer system, the software appliance can be detached from the operating system before the delivery.

The central provider system 150 can store and run a plurality of software appliances 122 for deployment. For example, after a registration request for the software appliance 122 is received, the central provider system 150 can detach the software appliance 122 by unregistering the software stack in the software appliance 122 from the central provider system 150. The information stored in the software stack may be used when the software appliance 122 is attached (also referred to herein as "installed") to another machine (e.g., 110 or 140). In an exemplary arrangement, after a software appliance 122 is "detached," the software appliance 122 can be reattached and/or restarted on the provider system 110. After the software appliance 122 is detached from the central provider system 150, the software appliance 122 can be saved as a library or repository (e.g., code, configuration information, requirement descriptions, operating system registry change descriptions, and/or appliance data) and delivered to the provider system 110 and/or user device 140. It should be understood that any of the computing systems or devices described herein can be installed with a software appliance 122. In one embodiment, the software appliance 122 including the software stack can be stored in a DVD, for example, and physically shipped to an individual of the provider system 110 for install. In other arrangements, the software appliance 122 including the software stack can be delivered as an image or an electronic file via the network 130 (or 135) to a provider system 110. For example, the software stack can be sent via the network 130 to a virtual server in data sources 160. A utility for attaching the software appliance 122 to the provider system 110 can also be provided with the software stack. Additionally, the attaching of the software appliance 122 can also include performing various steps (e.g., verifying the provider system 110, generating a public and private key pair, hardening the provider system 110, and so on) prior to or in parallel with storing and configuring the software appliance 122. Additional details regarding the additional steps are described in detail with reference to for example FIGS. 3-4.

Referring the software appliance 122 in more detail. In various arrangements, the provider database 120 can include a software appliance 122. In particular, the software appliance 122 can be a software application combined with an operating system and/or hardware that can be executable and run on the processing circuit of provider system 110 or in a virtual machine. The software appliance 122 may be distributed by central provider system 150. In various arrangements, the provider system 110 can be modified or updated to include additional hardware. For example, an individual of the central provider system 150 or provider system 110 may install a piece of hardware (e.g., storage device, memory device) or input, via an input of the provider system 110, a removable storage device (e.g., USB, DVD, SD card, and so on) that includes the software application. Accordingly, the software appliance 122 could include hardware and/or software capable of implementing a software appliance. In some examples, the individual may install the software application on a piece of hardware (e.g., storage device, such as a hard disk drive including an operating system) prior to installing the software appliance 122. In some arrangements, the software appliance 122 can be a virtual software appliance that can be executed by the provider system 110 on a virtual device or server (e.g., stored on central provider system 150 or data sources 160). In various arrangements, the software appliance 122 (virtual or installed) can be configured to be utilized as a bridge that functions as a proxy that providers a gateway between the provider system 110 and the central provider system 150.

The provider database 120 can also include subsets of data that each include information for performing one or more types of exchanges (e.g., commercial, person-to-person, state of exchange, on-ledger, off-ledger, and so on). The subsets of data (e.g., provided by data sources 160) may include, but are not limited to, tax data (e.g., taxes for municipality, tax deductions, sales tax, state taxes, federal taxes), insurance data (e.g., current policy premium), fee data (e.g., cleaning fees for rentals, processing fees for mortgage applications, student fees), expense data (e.g., expenses associated with service providers of the entity and/or users, software licensing expenses, utility expenses, rent expenses), allocation data (e.g., direct deposit allocation, percentage of monies allocated to a particular bank account), digital wallet information (e.g., 144, 174), and so on. Accordingly, the subsets of data can be used (e.g., supplemental data) by the provider interface 112 and/or EI system 114 to perform exchanges and issuance of digital currency tokens.

Further, the data stored in the provider database 120 may include personal information (e.g., names, addresses, phone numbers, and so on), authentication information (e.g., username/password combinations, device authentication tokens, security question answers, unique client identifiers, biometric data, geographic data, social media data, and so on), and financial information (e.g., token information, account numbers, account balances, available credit, credit history, exchange histories, and so on) relating to the various users and associated provider accounts. In some arrangements, the provider database 120 may include a subset of databases such that the provider interface 112 and/or provider system 114 can analyze each database to determine the appropriate information needed to perform an exchange or issuance of digital currency tokens.

Referring to the ledger systems (sometimes referred to herein as "ledger networks") described herein generally (e.g., 125, 155). Each ledger system (or network) can include a key dataset (e.g., 127, 156) and a digital currency ledger (e.g., 128, 157). Each ledger system can be configured to store and/or maintain any of the information described herein (e.g., digital currency tokens, smart contracts, public and private key pairs, etc.). In some arrangements, the described ledger systems and methods involve utilizing one or more processing circuits. The one or more processing circuits allow receiving, collecting, and sending of digital currency tokens, ledger information, issuance requests, exchange requests, public and private key pairs, activity data, smart contracts, and so on. The one or more processing circuits can then communicate with one or more nodes of the digital currency ledgers (e.g., 128, 157) and execute one or more smart contracts stored on the nodes to perform various checks (e.g., signing, verifying, distributing). The token storages (e.g., 146 and 176) can include similar features of functionalities of the ledger networks described herein. In particular, the token storages (sometime referred to herein as "token networks") can operate and perform the same or similar functions as the ledger networks described herein.

In various arrangements, the key datasets (e.g., 127, 156) can include a plurality of public and private key pairs (referred to hereafter as "key pairs"). In some arrangements, the ledger systems can include a hardware security module (HSM) that can manage cryptographic keys. Each key pair can be stored (e.g., by interfaces 112, 151, or by EI systems 114, 152) in the key dataset utilizing a cryptographic function. For example, the cryptographic function could be a homomorphic encryption function. In another example, the cryptographic function could be any symmetric encryption function (e.g., Triple Data Encryption Standard (TDES), RCS, Advanced Encryption Standard (AES), Blowfish, CAST, and so on), and/or asymmetric encryption function (e.g. Rivest-Shamir-Adleman (RSA), Efficient and Compact Subgroup Trace Representation (ECSTR or XTR), Digital Secure, Escrowed Encryption Standard (EES), and so on). In some arrangements, the private key can be used to encrypt digital currency tokens (e.g., using a cryptographic function) at the source system (e.g., provider ledger system 125, central ledger system 155, and so on) when an issuance or exchange occurs (e.g., send digital currency token from a source address to a destination address). In various arrangements, the public key can be used by the destination system (e.g., user devices 140, third-party devices 170) to decrypt the encrypted digital currency token.

In some arrangements, the digital currency ledgers (e.g., 128, 157) can include a plurality of nodes configured to store a copy of one or more digital currency tokens. In various arrangements, each node may contain a copy of an individual digital currency token associated with an account or customer of a provider. Each individual digital currency token may have one or more metadata fields such as, but not limited to, an identifier field, denomination amount, assignee, and so on. In various arrangements, the plurality of nodes on the digital currency ledgers (e.g., 128, 157) can be interconnected via a central node (e.g., centralized or generalized). Indeed, each node can perform various operations (e.g., execute smart contracts, update digital currency tokens) on the digital currency ledger. Thus, the central node can operate as an intermediary between any system or device with data not stored on the ledger such that, any communications (e.g., exchange requests, wrapping requests, template selection, public and private key access) first is received by the central node. As such, the central node may be configured to route communications and/or query one or more nodes on the digital currency ledger upon receiving a communication from any system or device described herein. In some arrangements, the central node may be a digital currency token and may be the root node (e.g., the originally created digital currency token), and any additional nodes added may be attached (e.g., appended, pre-pended, linked, associated, embedded) to the central node via one or more communications networks (e.g., public, private, shared, and so on). In various arrangements, the central node may be a dummy digital currency token that stores data (e.g., addresses) to communicate with the other nodes on the digital currency ledger 128.

For example, each node (e.g., other than the central node) on the provider digital currency ledger 128 may contain one or more digital currency tokens associated with a denomination or amount of digital and/or virtual currency (e.g., virtual USD) and have one or more metadata fields (e.g., identifier, assignee, and so on). Alternatively, the plurality of nodes on the digital currency ledgers could be interconnected with the plurality of nodes to form a peer-to-peer network (e.g., distributed ledger network). In the following arrangement, instead of a central node operating as an intermediary, each node may contain a copy of a plurality of digital currency tokens associated with the one or more providers or users and can operate as an individual intermediary which may contain a copy of a plurality of digital currency tokens associated with the one or more providers or users. Additionally, each node could be configured to determine functions to perform (e.g., execute a smart contract, send public key, modify assignee, update identifier) based on communications. While various circuits, interfaces, and logic with particular functionality are shown, it should be understood that the digital currency ledgers can include any number of circuits, interfaces, and logic for facilitating the functions described herein. For example, the activities of multiple circuits may be combined as a single circuit and implemented on a single processing circuit, as additional circuits with additional functionality are included.

The EI system 114 can be configured to process issuance and exchanges of digital currency and may be configured to perform various actions and/or access various types of data, some of which may be provide over network 130 or private network 135. In particular, the EI system 114 can be configured to process digital currency exchanges based on received public keys (or public and private key pairs), activity data (e.g. usage associated with an IoT device 145), and one or more metadata fields of one or more digital currency tokens stored on a ledger network (e.g., 128, 157) and/or token storage (e.g., 146, 176). Additional details and examples relating to issuance and exchanges of digital currency are described in detail with reference to FIGS. 2 and 5.

In some arrangements, exchanges of digital currency tokens on a ledger network (e.g., 128, 157) and/or token storage (e.g., 146, 176) include utilizing smart contracts (e.g., virtual contracts/agreements). As used herein, the phrase "smart contract" generally refers to a self-executing code (e.g., in a ledger network, token storage, or other system) that executes when a set of conditions that have been agreed upon by the parties of the smart contract are met. Although the FIGS. and specification generally discuss exchanges and issuance of digital currency tokens, the systems, methods, and apparatuses disclosed herein can also be used for exchange or issuing a plurality of types of financial services, such as but not limited to deeds, leases, wills, non-smart contracts, traditional legal contracts, financial disbursements, taxes, and other types of agreements between one or more parties. Parties to the exchange or issuance or other types of agreements may be individuals, companies, organizations, entities, providers, and so on.

Accordingly, when an issuance request (or exchange request) is received (e.g., by the provider interface 112), the EI system 114 may communicate a command to the provider ledger system 125 to execute a smart contract, and as a result update the provider digital currency ledger 128. In various arrangements, each command can include program code (e.g., a script or an executable) that, when executed by a ledger network (e.g., 128, 157) or token storage (e.g., 146 and 176), causes the smart contract to execute a specific set of instructions. Updating the provider digital currency ledger 128 can include utilizing a public key or private key for a particular digital currency token.

The central provider system 150 (including similar features and functionalities as the provider systems 110) may be configured to perform various actions and/or access various types of data, some of which may be provide over network 130 or private network 135. The term "central provider" as used herein may refer to a federal reserve (or central bank) with one or more individuals operating the central provider system 150 and interacting with resources or data via the central provider system 150. The central provider system 150 may be used to send data (e.g., tokens) to the provider system 110 and user devices 140, or may be used to provide an interface (e.g., via the central interface 151) for exchanging digital currencies on a ledger network (e.g., central ledger system 155) or off-ledger via the private network 135. The central provider systems 150 can include one or more processors (e.g., any general purpose or special purpose processor), and include and/or be operably coupled to one or more transitory and/or non-transitory storage mediums and/or memory devices (e.g., any computer-readable storage media, such as a magnetic storage, optical storage, flash storage, RAM, and so on). In some arrangements, the central provider system 150 can be configured to convert physical central bank notes into CBDC, and vice versa. In various arrangements, the central provider system 150 can interface (e.g., using central interface 151) with consumers and providers of the given country, state, or region to facilitate exchanges of digital assets such as CBDC into consumer or provider accounts, or vice versa. Additionally, the central provider system 150 may provide digital currency that can accrue interest.

The central provider system 150 can include a configuration system 153. It should be understood that the configuration system 118 of provider system 110 can include similar features and functionality as the configuration system 153 and of central provider system 150. The configuration system 153 can set up (e.g., register) and custodian digital currency tokens utilizing tiered models (e.g., one-tier, two-tier). In general, custodianship of digital currency tokens can include managing one or more remote digital currency tokens stored in a remote location on a remote device (e.g., 110, 140, 170). In particular, the remote digital currency tokens (e.g., digital currency tokens stored anywhere but central ledger system 155) may be stored on a ledger, token storage, or other device on or off ledger. For example, user device 140 may store a plurality of digital currency tokens in token storage 146. In another example, provider system 110 may store a plurality of digital currency tokens on provider digital currency ledger 128.

As used herein, "software appliance" can be a software application combined with just enough operating system (JeOS) to execute and run on systems and/or devices described herein. For example, the software appliance 122 can be installed on the provider database 120. In another example, the software appliance can installed and stored on central provider system 150 such that the provider system 110 may stores a virtual software appliance for communicating with the software appliance stored on the central provider system 150. As such, the software appliance can be stored on or virtually accessed by the one or more processing circuits described herein. In some arrangements, the software appliance can be a virtual appliance including a pre-configured virtual machine image (VMI). In particular, the pre-configured virtual machine image can be an executable image file containing a software configuration, including an operating system (OS).

Furthermore, as used herein a "software stack" can be code (sometime referred to herein as "components") for executing the software appliance. In some arrangements, the software stack can include components (or code) for receiving commands or transmitting commands to exchange or issue digital currency tokens. The software stack can also include components for storing and securing a plurality of data including, but not limited to, activity data (e.g., usage of one or more goods or services, user device usage, such as location changes based on a geolocation or digital wallet application usage, and so on), exchange data (e.g., token information, public and private key pairs, address information (e.g., source or destination), ledger information, denomination, and so on), central provider data (e.g., digital currency addresses on central digital currency ledger 157, public and/or private keys of the central key dataset 156, digital currency of central digital currency ledger 157, and so on), ledger data (e.g., digital currency addresses on provider digital currency ledger 128, public and/or private keys of the provider key dataset 127, digital currency of provider digital currency ledger 128), and so on. In various arrangements, the software stack components may be based on an operating system and the software configuration of the software appliance.

In various arrangements, the software stack can include sets of application programming interfaces (APIs) and software development kits (SDKs) (collectively referred to herein as "components") for configuring the system or device to communicate with other devices and systems described herein. The configuration can include a central bank protocol that can enable the digital wallets (e.g., 144 and 176) and software appliance 122 to interact with each other. In particular, the central provider system 150 may have one or more designated/endorsed wallet providers (e.g., systems and devices with the installed software appliance 122 such as provider system 110 and/or other digital wallet providers) that can be connected to a parent network of the private network 135. The parent network can provide access and allow the designated/endorsed wallet providers (e.g., in particular, EI system 114) to exchange digital currency tokens via the private network. In turn, the designated/endorsed wallet providers may communicate with consumers or users via a child network of the private network 135. As such the child network may have a greater number of endpoints. Thus, the two network model (e.g., two-tiered model of FIG. 6) can provide data security improvements when issuing and exchanging digital currency on or off ledger.

Accordingly, the use of software appliances and software stacks associated with maintaining and exchanging digital currency provides improvements to data security as the software appliance can be used to execute digital currency transactions in isolation from other processes being executed and run on the processing circuit. Additionally, the software appliance provides improved performance when performing digital currency exchanges as the software appliance does not consume hardware resources (e.g., CPU, memory, storage space) usually consumed by those on a typical operating system (OS) setup.

As used herein, "hardening" refers to performing/executing one or more functions or instructions (sometime referred to herein as "hardening techniques") to mitigate and reduce vulnerabilities on a device and/or system described herein. Vulnerabilities can include, but is not limited to, software vulnerabilities, network vulnerabilities, hardware vulnerabilities, and so on. As such, hardening can include executing a plurality of instructions on a device or system described herein to protect various layers of the device or system (e.g. host level, application level, operating system level, user level, physical level, and so on). In some arrangements, hardening techniques can include various software and/or hardware implemented by the configuration system 153 and configuration system 118 for mitigating cybersecurity vulnerabilities and threats, proactively increasing cybersecurity, and reducing the likelihood of a cyber-incident (e.g., data breaches, ransomware, cyberattacks (e.g., phishing attacks, malware attacks, web attacks, and artificial intelligence (AI) powered attacks), and other detrimental cyber-incidents). While hardening techniques may not eliminate all cyber-incidents, they can provide extra layers of security against cyber-incidents (e.g., improved protection) to user devices 140 and provider system 110. Some hardening techniques can include implementing antivirus and antispyware software, removing one or more files on the device or system, scanning and removing installed programs (e.g., based on known vulnerabilities or previous attacks), implementing one or more firewalls, updating software and operating systems as they become available (e.g., availability determined based on scanning and/or retrieving data from data sources 160), implementing backup systems, implementing access control (e.g., requiring a password, disabling face-ID, disabling biometric unlock, disable pin unlock, disable password saving in storage of cache or memory) to the user device 140 or provider system 110 and other computers and network components, implementing secure Wi-Fi™ networks (e.g., private network 135), implementing virtual data and information access controls (e.g., password protected files or applications such as digital wallet application 144), and implementing the changing of passwords frequently (e.g., every week, every month).

In some arrangements, the configuration system 153 (or configuration system 118) can be communicably coupled to the user device 140 via network 130 prior to establishing a private network connection via private network 135. In particular, the configuration system 153 can establish, utilizing an application programming interface (API), a data feed associated with the installing the digital wallet application on the user device 140. The data feed can be used to execute API calls with the API, where the API calls return the installation information (e.g., system requirements verified, hardening complete, digital wallet application stored and configured). In various arrangements, the API calls can perform and/or execute one or more instructions on the user device 140. For example, an API call can include instructions for verifying the user device meets one or more system requirements (e.g., instructions including code for performing one or more tests). In another example, an API call can include instructions for generating one or more public and private key pairs (e.g., instructions including code for performing one or more encryption algorithms). In yet another example, an API call can include instructions for hardening the user device 140 (e.g., instructions including code for scanning/removing an install application or stored file, code for testing one or more network connections. code for updating an operating system). In various arrangements, the user device 140 can install the digital wallet application based on an installation package received during the download of the digital wallet application. In particular, the configuration system 153 can generate the installation package to include similar instructions and code for performing operations provided via the API calls.

In various arrangements, the configuration system 118 can install and configure a software appliance 122 on the provider system 110 and store the software appliance 122 in provider database 120. In some arrangements, the configuration system 153 may execute API calls via an API over an established data feed (similar to configuring the user device 140 described above). As such, API calls can be executed by the provider system 110 to install and configure the software appliance 122. The software appliance 122 can include a software stack including a software appliance and any dependencies (e.g., operating system, files or instructions for installing such as performing the various steps described below with reference to FIGS. 3-4). In some examples, the configuration system 118 can first download or receive the software appliance 122 from the central provider system 150. In particular, the software stack of the software appliance 122 can be delivered via network 130 and installed (or attached) to the provider system 110. In some arrangements, configuring the software appliance 122 can include determining whether the software appliance 122 can be installed such as performing the steps of FIGS. 3-4. Furthermore, configuring can include checking the provider system 110's (or user device 140) network settings, hardware, file system layout and permissions, memory space, time server, user management, virtual hostnames, or other parameters to determine if the system and the database in the software appliance can run on the provider system 110.

In various arrangements, the software appliance 122 can be virtual such that distribution of the software appliance 122 can include installing an application by the configuration system 118 to access the software appliance 122 virtually. In particular, the virtual software appliance can be pre-installed, pre-configured, and pre-patched to enable improved distribution of software appliance 122 across computing systems and devices. It should be understood, the software appliance 122 can be an application software designed to meet one or more business or industrial needs (e.g., enabling exchanges and issuances of digital currency). For example, the software appliance can be a digital currency application software for exchanging and issuing digital currency. The database in the software appliance 122 can be the database software underneath the system in the software appliance. For example, the database software can include SAP MaxDB®, Oracle®, IBM DB2®, Microsoft SQL Server® or other database software.

In some arrangements, hardening includes generating and transmitting to the provider system 110 or user device 140 a request for access-controlled information, the request including authentication information. In some arrangements, instead or in addition to performing hardening, a scan or scanless operation can be initiated to identify existing (e.g., cached, previously stored) device or system information. Thus, by verifying system requirements, hardening devices, configuring the software appliances and digital wallet applications, and establishing a private network connection, the systems and methods of this technical solution can reduce and mitigate security vulnerabilities with cryptocurrency exchanges, increasing the user accessibility of users of digital currency via a one-tiered model, and reducing resource consumption in performing security checks (e.g., every time an exchange occurs) of devices or systems since the installation and establishment of a private network connection includes performing one or more operations to reduce vulnerabilities on the systems and devices described herein.

Figure 2:
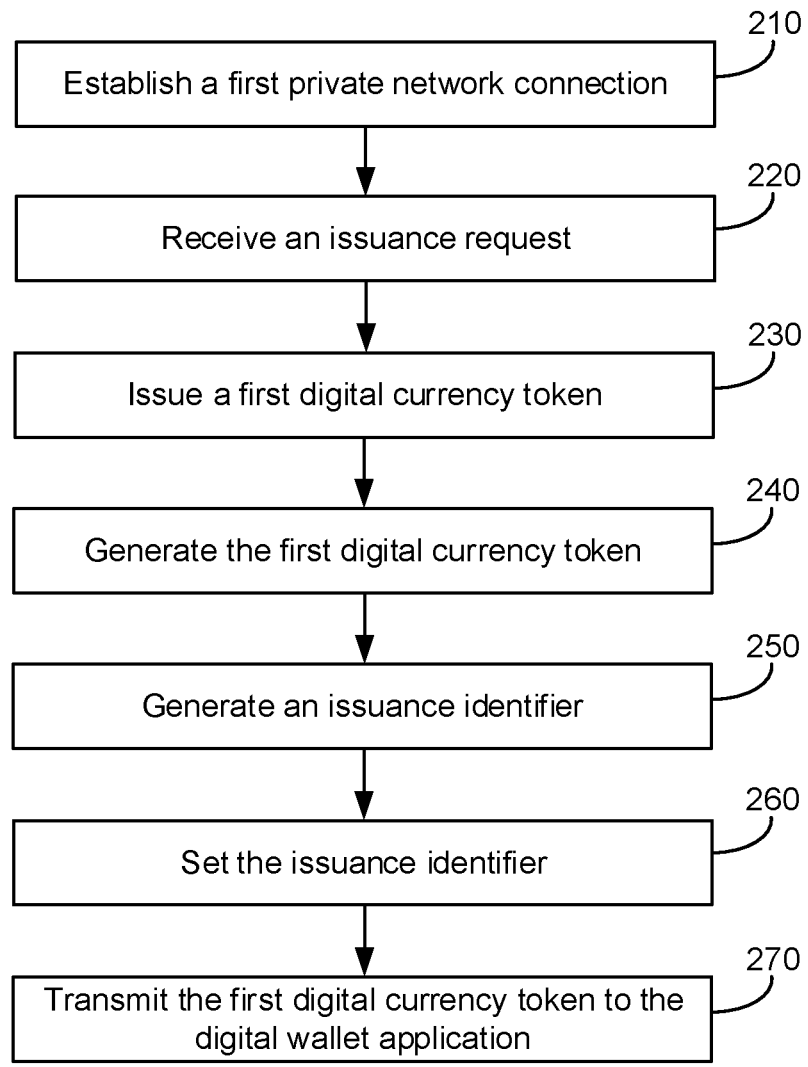
FIG. 2 is a flowchart for a method of private network issuance of digital currency, according to some arrangements.

Referring now to FIG. 2, a flowchart for method 200 of private network issuance of digital currency, according to some arrangements. Central provider system 150 and/or provider system 110 can be configured to perform method 200. Further, any computing device or system described herein can be configured to perform method 200.

In broad overview of method 200, at block 210, the one or more processing circuits (e.g., central provider system 150 and/or provider system 110 in FIG. 1) can establish a first private network connection. At block 220, the one or more processing circuits can receive an issuance request. At block 230, the one or more processing circuits can issue a first digital currency token. In particular, issuing can include, but is not limited to, the one or more processing circuits performing the steps of blocks 240-270. At block 240, one or more processing circuits can generate the first digital currency token. At block 250, the one or more processing circuits can generate an issuance identifier. At block 260, the one or more processing circuits can set the issuance identifier. At block 270, the one or more processing circuits can transmit the first digital currency token to the digital wallet application. Additionally, fewer, or different operations may be performed depending on the particular arrangement. In some arrangements, some or all operations of method 200 may be performed by one or more processors executing on one or more computing devices, systems, or servers. In various arrangements, each operation may be re-ordered, added, removed, or repeated.

Referring to method 200 generally, issuing and/or exchange digital currency originating from a provider (e.g., bank) or central provider (e.g., central bank, bank, cryptocurrency developer) can include establishing a secure connection (e.g., private network connection) between the provider or central provider and digital wallet application of a user (e.g., user device 140). After a secure connection is established, the provider or central provider and user device can be communicably coupled such that the digital wallet application can receive (e.g., upon a request, such as an issuance request) digital currency tokens generated by the provider or central provider. In some arrangements, issuing a digital currency (e.g., CBDC) can include using a unique identifier with one or more metadata fields that can be traced by the provider or central provider. As such, the provider or central provider could trace the digital currency flow at any point in time and understand how the digital currency is being spent based on the unique identifier. A bank, central government, or consumer could withdraw digital currency directly from a digital wallet application based on the unique identifier. For example, the unique identifier could be a tax identifier number (TIN), bank identifier number (BIN), wallet provider identifier (WPI), or a unique protocol. In some arrangements, tracing the digital currency using a unique identifier can include gathering (e.g., by 110 or 150) statistics throughout the lifecycle of the digital currency. Additionally, the issuance of digital currency via a private network connection can be based on a digital currency compatible digital wallet application (e.g., 144, 174). The digital currency compatible digital wallet application can be implemented based on software distributed by the provider or central provider (described in detail with reference to FIGS. 3-4).

Referring to method 200 in more detail, at block 210, the one or more processing circuits (e.g., provider system 110 in FIG. 1) can establish, via a first private network (sometimes referred to as a "digital wallet network"), a first private network connection between a digital wallet application (e.g., 144) of a user device and the processing circuit (e.g., 150). For example, the provider interface 112 or central interface 151 of the one or more processing circuits can establish a private network connection over the private network 135. That is, the private network connection can allow for secure communication and secure transfer of data to/from the one or more processing circuits over the private network 135 (e.g., secure VPN connection, secure wired connection, and so on) utilizing a secure network protocol (e.g., Secure Shell (SSL), Kerberos, IPSec, Secure Sockets Layer (SSL), Hypertext Transfer Protocol Secure (HTTPS), and so on). In various arrangements, prior to transferring or transmitting digital currency tokens from a source device (e.g., 150) to a destination device (e.g., 140) a private network connection may be established. In some arrangements, a private network connection can be established between two systems or devices (e.g., 140 and 150, 150 and 170, 140 and 170, 110 and 150, 110 and 140, and so on) such that any communications (e.g., data transfers) can be encrypted before being sent and then decrypted upon receipt. Additionally, all communications over the private network 135 can be encrypted with the one or more secure network protocols (e.g., Secure Shell (SSL), Kerberos, IPSec, Secure Sockets Layer (SSL), Hypertext Transfer Protocol Secure (HTTPS), and so on) implemented utilizing a cryptographic function (e.g., symmetric encryption, asymmetric encryption, hashing, and so on). For example, the cryptographic function could be a homomorphic encryption function. In other examples, the cryptographic function could be any symmetric encryption function (e.g., Triple Data Encryption Standard (TDES), RCS, Advanced Encryption Standard (AES), Blowfish, CAST, and so on), and/or asymmetric encryption function (e.g. Rivest-Shamir-Adleman (RSA), Efficient and Compact Subgroup Trace Representation (EC-STR or XTR), Digital Secure, Escrowed Encryption Standard (EES), and so on).

In some arrangements, the private network 135 can be a virtual private network (VPN) without a publicly accessible endpoint or internet routable internet protocol (IP) address. In particular, the source and destination device can each be nodes of a plurality of nodes on the private network, such that each node can be assigned a private IP address. In various arrangements, establishing the private network connection includes establishing a communication session between the source device and destination device on the private network. That is, the communication session can be a handshake associated with an encryption algorithm for exchanging data over the private network such as by using the secure network protocols and/or cryptographic functions described above. In various arrangements, the handshake and establishing the private network connection can be between a digital wallet application (e.g., of user device 140) or software appliance (e.g., of provider system 110) which can be configured to establish the first private network connection. For example, if provider system 110 does not have an installed software appliance (e.g., 122) the central provider system 150 may initiate an installation including providing a software stack. In another example, if user device 140 does not have an installed digital wallet application, the central provider system 150 may initiate an installation of the application. Additional details regarding configuring and setting up the devices and system herein for digital currency token exchange and issuance is described in more detail below with reference to FIGS. 3-4.

In various arrangements, establishing the first private network connection can be in response to authenticating, by the one or more processing circuits, a login by the user device into the digital wallet application. For example, when the user of a user device 140 access the digital wallet application 144, a private network connection can be automatically establish based on the user logging into the digital wallet application. In particular, a user login can be an input by the user or an automatic capture by the user device 140. For example, a user can input a username and password, a pin, a security answer, and so on. In another example, the user device 140 may automatically capture by the I/O circuit 140 a biometric or geolocation of the user. Accordingly, once the user of the digital wallet application 144 is authenticated the user device 140 can communicate with provider system 110 or central provider system 150, or vice versa, upon receiving an indication of a login, to establish a private network connection via private network 135 (i.e., digital wallet network).

As such, the user device 140 (170 or any device and/or system described herein) can use one or more input devices (E.g., I/O circuit 140) to collect and aggregate additional information for use in authenticating and performing an exchange or issuance of digital currency tokens. For example, the additional information (sometimes referred to herein as environmental data) can include, but is not limited to, IP addresses, MAC addresses, governmental data (e.g., FBI databases, CIA databases, COVID-19 databases, No Fly List databases, terrorist databases, vulnerability databases, and certificate databases), network packets, host name, network addresses, communication protocols, interactions with other networks or devices, historical exchange data, documents, agreements, smart contracts, ledger information, and so on. In another example, additional information can also include, but is not limited to, biometric data (e.g., biological data such as fingerprint, iris/retina, hand geometry, facial geometry, DNA, and so on, and behavioral data such as, gait, gesture, keystroke dynamics, speech pattern, foot movement pattern, etc.), weather conditions, geographic locations (e.g., latitude and longitude, triangulation), and so on. In yet another example, additional information can also include, but is not limited to, social media data (e.g., Facebook, Twitter, Snapchat, and TikTok), news feed data (e.g., articles, breaking news, and television content), and so on.

At block 220, the one or more processing circuits can receive an issuance request associated with a first denomination of digital currency. The issuance request can be a data packet including metadata for performing an issuance of digital currency. The first denomination can be, but is not limited to, an amount of fiat currency (USD), cryptocurrency (e.g., Bitcoin), CBDC, or any type of collateral (e.g., stocks, mutual funds). In particular, the denomination may be converted (e.g., based on an exchange rate) to an amount of digital currency (e.g., CBDC). In some arrangements, the metadata can include the destination address of the issuance (e.g., wallet address such as hashed version of the public key), a desired type (e.g., US CBDC, EU CBDC), authorization rules (e.g., limiting one or more functionalities of the digital currency), and so on.

At block 230, the one or more processing circuits can issue a first digital currency token, wherein issuing is an off-chain exchange transferring the first denomination outside a digital currency ledger. In some arrangements, issuing can include a plurality of functions or executions performed by the one or more processing circuits. Referring to off-chain issuances (or exchanges) in general, off-chain exchanges can occur on a cryptocurrency ledger that moves the value outside the blockchain. For example, the user device 140 or provider system 110 may not store and have access to a blockchain (e.g., central ledger system 155). Accordingly, any exchanges off-chain can include various advantages over on-chain exchanges, for example, the exchange or issuance digital currency tokens can occur instantly and does not depend on network load and/or number of exchanges waiting in the queue to be confirmed on the blockchain (e.g., on-chain). Furthermore, performing the off-chain exchange of digital currency tokens provides anonymity of the exchange as the exchanges are not recorded on a publicly available (or even privately available) blockchain or ledger. For example, the off-chain exchange or issuance can occur utilizing a hashed timelock contracts (HTLC) with bi-directional payment channels enabling payments to be securely routed across networks without utilizing a blockchain (ledger) for recording. In particular, an HTLC can include a class of payments that use hashlocks and timelocks to require that the receiver of a payment either acknowledge receiving the payment prior to a deadline by generating cryptographic proof of payment or forfeit the ability to claim the payment, returning it to the payer. In another example, the off-chain exchange or issuance can occur utilizing a trusted third party such as provider system 110 can add the digital currency token and value of the token to the source address and remove the digital currency token on the source address (e.g., accessing the source and destination via an API or private network 135). In yet another example, the off-chain exchange or issuance can occur utilizing two parties and their respective devices (e.g., 140 and 170). Exchanges off-ledger are described with further reference to U.S. patent application Ser. No. 17/528,352, filed Nov. 17, 2021, the entire disclosure of which is incorporated by reference herein.

In various arrangements, issuing can include the one or more processing circuits performing blocks 240-270. At block 240, the one or more processing circuits can generate the first digital currency token including one or more metadata fields based on a reallocation of at least one digital currency token of a plurality of digital currency tokens stored on the digital currency ledger, wherein reallocation includes updating a token value of the at least one digital currency token on the digital currency ledger utilizing at least one public and private key pair.

In various arrangements, reallocation can include splitting a second digital currency token into the first digital currency token including the first denomination and a third digital currency token including a leftover denomination. That is, the first digital currency token and the third digital currency token can be copied by the one or more processing circuits to include the one or more metadata fields of the second digital currency token. Alternatively or in combination, reallocation can include aggregating at least two digital currency tokens of the plurality of digital currency tokens including an aggregate denomination of the at least two digital currency tokens and copies of the one or more metadata fields of each of the at least two digital currency tokens. In some arrangement, reallocation can include both splitting and aggregating. In particular, the reallocation can include splitting a second digital currency token into the first digital currency token including the first denomination and a third digital currency token including a leftover denomination, wherein the first digital currency token and the third digital currency token are copied by the processing circuit to include the one or more metadata fields of the second digital currency token, and aggregating at least two digital currency tokens of the plurality of digital currency tokens including an aggregate denomination of the at least two digital currency tokens and copies of the one or more metadata fields of each of the at least two digital currency tokens, and wherein the at least two digital currency tokens include the first digital currency token.

When the provider system 110 is the one or more processing circuits as described in method 200, the one or more processing circuits can determine the digital currency ledger (e.g., 128) has deficient funds to satisfy the issuance request. In turn, the one or more processing circuits could establish a second private network connection between a provider system (e.g., 110) and the central provider system (e.g., 150) and transmit, via the second private network, a replenishment request associated with a second denomination of additional digital currency, where the second denomination is greater than the first denomination of block 240. Furthermore, the one or more processing circuits can receive, via the second private network, additional digital currency tokens including one or more metadata fields based on the replenishment request which can be stored and the digital currency ledger (e.g., 127 and 128) can be updated based on the second denomination. Exchanges across ledgers is described with further reference to U.S. patent application Ser. No. 17/528,352, filed Nov. 17, 2021, the entire disclosure of which is incorporated by reference herein.

At block 250, the one or more processing circuits can generate an issuance identifier associated with the issuance request. For example, the unique identifier could be a tax identifier number (TIN), bank identifier number (BIN), wallet provider identifier (WPI), or a unique protocol. That is, the one or more processing circuits may utilize an internal tool and/or external third-party tool to generate a unique identifier (e.g., UUID, URI, Cryptographic Hash, and so on) associated with the specific first digital currency token. In one example, the one or more processing circuits may execute a software application that produces a unique identifier. In another example, the one or more processing circuits may send a request to a third-party to provide a unique identifier, which can be subsequently received after generation. In various arrangements, the unique identifier can be a pre-determined length (e.g., 32 bytes, 64 bytes, 128 bytes).

In various arrangements, the issuance identifier can include a plurality of sub-identifiers (e.g., issuance identifier can be a superset of sub-identifiers). For example, the issuance identifier can include a banknote identifier (e.g., identifying the token and value), an issuer identifier (e.g., identifying the issuer of the digital currency token), and a receiver identifier (e.g., identifying the receiver of the digital currency token), a country identifier (e.g., identifying the country the digital currency was issued), and so on. Accordingly, the issuance identifier can be a combination of sub-identifiers utilizing a plurality of combinations. That is, the issuance identifier can be a pre-determined length and include the subset of identifiers in a variety of combinations. For example, the banknote identifier may be at the front of the issuance identifier, (e.g., "5124487569853647_"), the issuer identifier may be in the middle of the issuance identifier (e.g., "_USCNTRLBNK_"), and the receiver identifier may be at the end of the issuance identifier (e.g., "_WALLLETID-61Wf5baNk9c56").

At block 260, the one or more processing circuits can set the issuance identifier in an identifier field of the one or more metadata fields of the first digital currency token. In particular, the one or more processing circuits can modify, add, or append the identifier field to include the issuance identifier. In various arrangements, the one or more processing circuits can generate a smart contract for tracking the digital currency token. The smart contract may be linked or associated with to the issuance identifier and execute upon an exchange of the digital currency token. That is, when an exchange is received or initiated the smart contact may access the identifier field to determine if the issuance identifier is linked to the smart contract attempting to execute. In turn, upon verifying the identifier field, the smart contract can execute and provide a notification via a network (e.g., 130 or 135) to the central provider system 150 and/or provider system 110 indicating the digital currency token associated with the issuance identifier is being exchanged. The notification may include the value of the exchange, source and destination address, and information associated with each party of the exchange. In some arrangements, the user device 140 may opt-in to tracking of the digital currency token.

At block 270, the one or more processing circuits can transmit the first digital currency token to the digital wallet application. In some arrangements, the digital currency token can be transmitted via the private network connection. In some arrangements, issuing can further include updating the digital currency ledger (e.g., 156 and 157, or 127 and 128) based on the first denomination of the first digital currency token. In particular, the digital currency ledger can include a blockchain, wherein the off-chain exchange is an exchange of digital currency occurring off the blockchain. Updating digital currency ledgers is described with further reference to U.S. patent application Ser. No. 17/528,352, filed Nov. 17, 2021, the entire disclosure of which is incorporated by reference herein.

In some arrangements, issuing the first digital currency token can be based a rule dataset, where the rule dataset includes a plurality of authorization rules limiting (or restricting) one or more functionalities of the first digital currency token, and where the plurality of digital currency tokens represents a tradable asset. In some arrangements, the rule dataset can include conditions that can restrict functionalities (e.g., uses) of the digital currency token and one or more additional actions to execute if the conditions have been satisfied (e.g., update a metadata field of the digital currency token). The conditions can include, but are not limited to, spending parameters (e.g., spending limits, expiration, per exchange limit, amount, and so on), geolocation parameters (e.g., digital asset must be used in certain location or area), environmental parameters (e.g., exchange must be from a renewable resource (e.g., exchange for electricity used by an electric car), exchange can only occur when the temperature drops below 30 (e.g., to purchase a snow shovel), and so on), exchange type parameters (e.g., online, wire, automated clearing house (ACH), mobile, and so on), good or service type parameters (e.g., food, utilities, rent, school supplies, and so on), and so on. Restricting functionalities of digital currency (e.g., digital assets) are described with further reference to U.S. patent application Ser. No. 17/528,352, filed Nov. 17, 2021, the entire disclosure of which is incorporated by reference herein.

Figure 3:
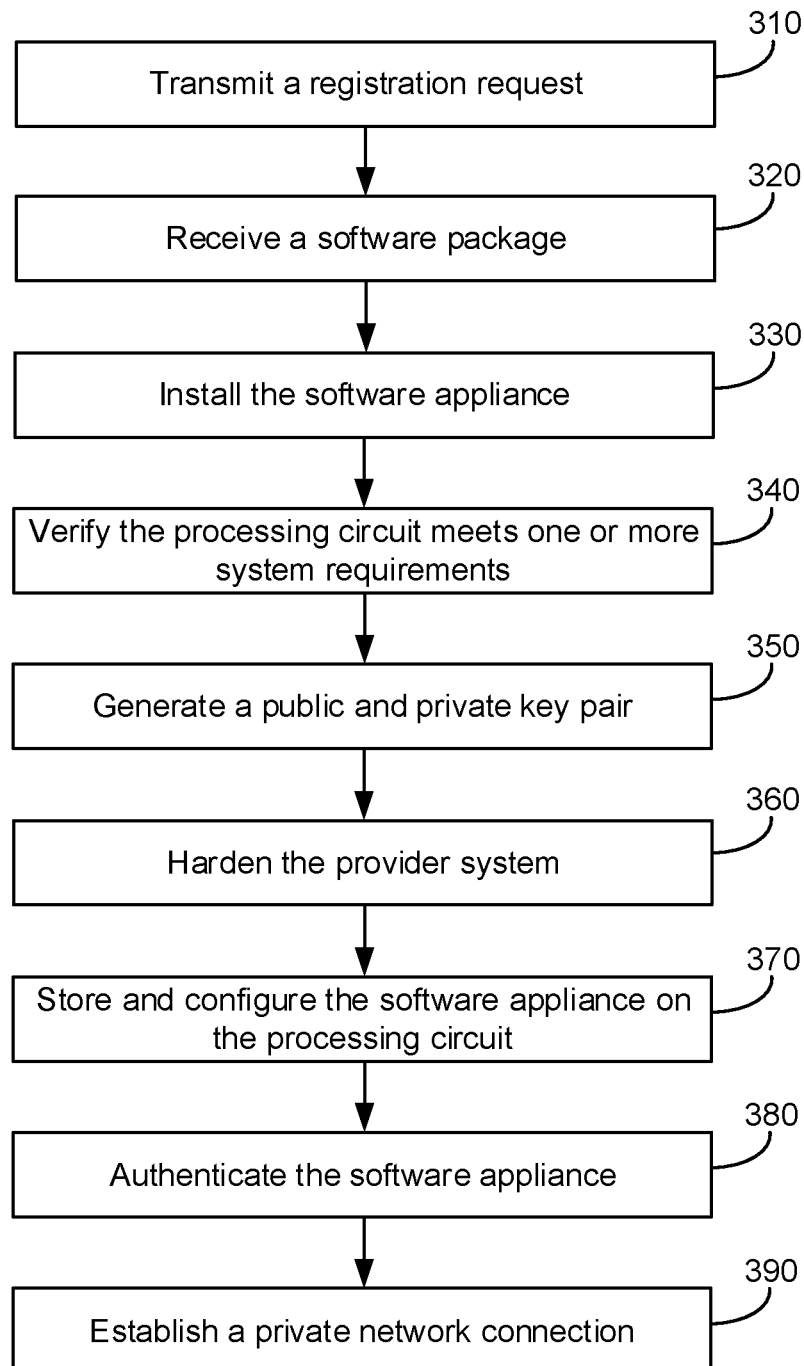
FIG. 3 is a flowchart for a method of configuring digital currency nodes utilizing a two-tier model, according to some arrangements.
Figure 4:
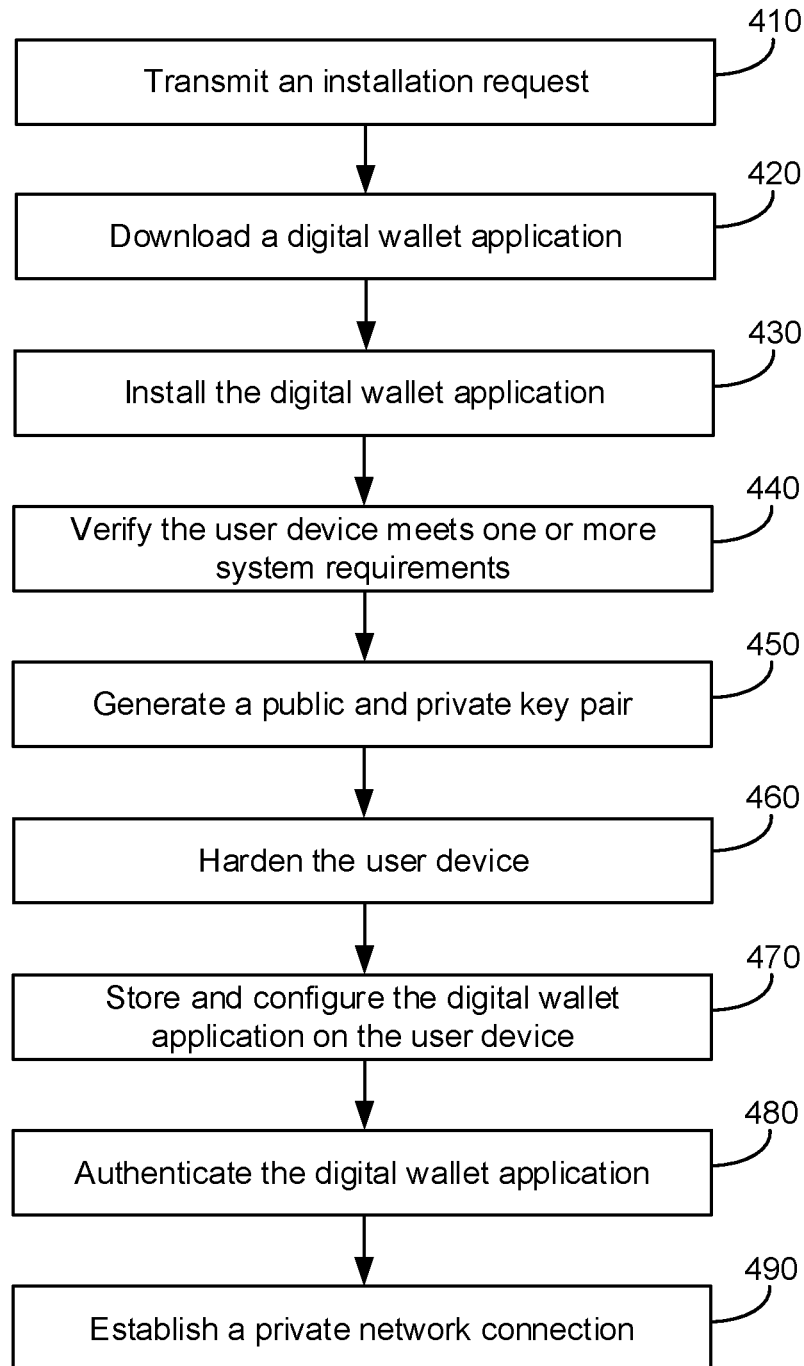
FIG. 4 is a flowchart for a method of configuring digital currency nodes utilizing a one-tier model, according to some arrangements.
Figure 6:
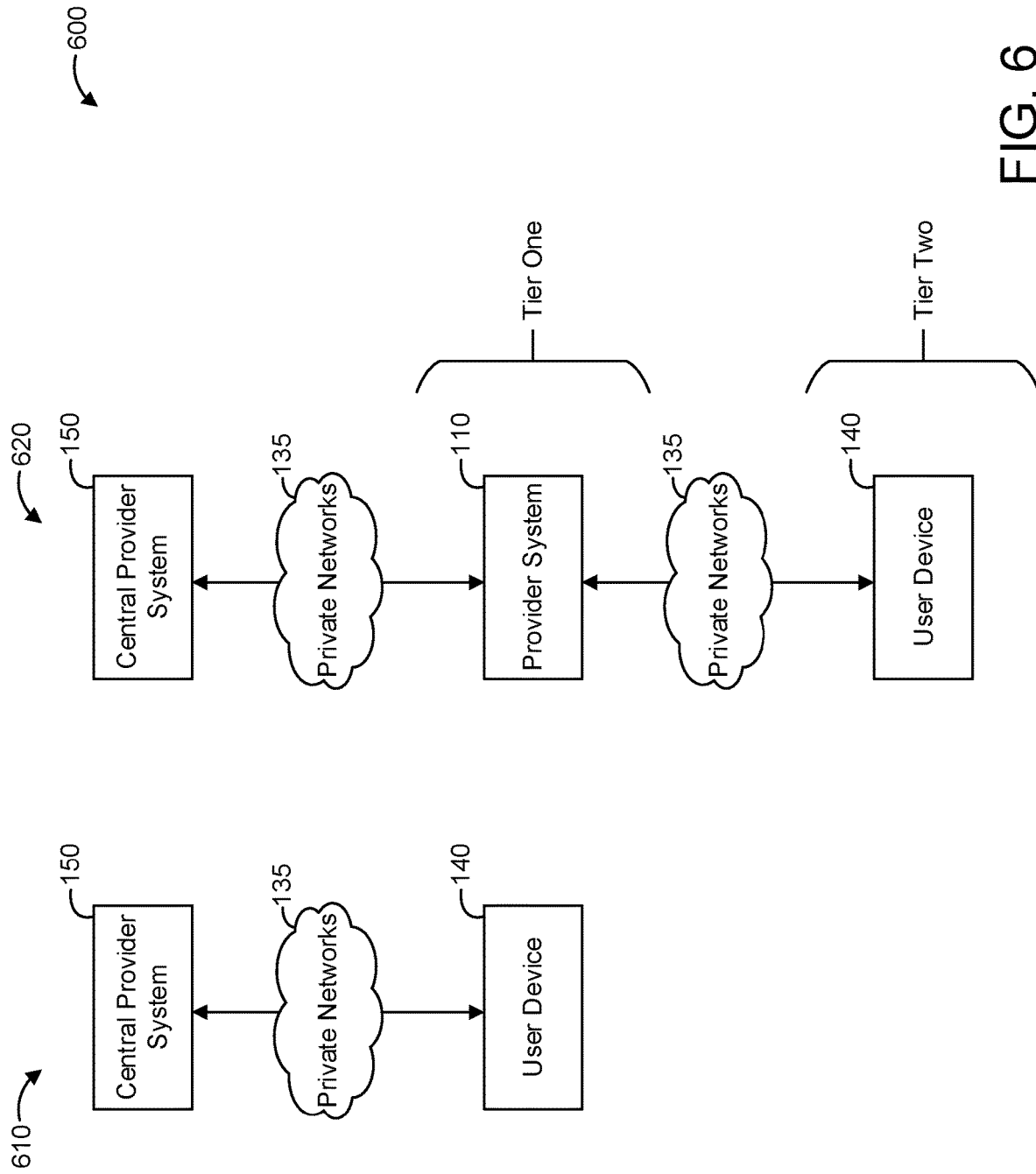
FIG. 6 is a block diagram depicting an implementation of a digital currency architecture, according to some arrangements.

Referring generally to FIGS. 3-4 and 6, custodianship of digital currency can based on a one-tier model or two-tier model. In various arrangements, the one-tier model can be between a central provider system 150 and user device 140. In particular, the one-tier model can be a direct link, via a private network 135, between a central bank (e.g., United States) and a user (e.g., citizen of the United States). In some arrangements, the one-tier model can include downloading and installing a digital wallet application (e.g., from an app store). However, unlike a typical download, the one-tier model can include executing by the user device 140 various functions to configure and secure the user device 140 for storing and exchange digital currency tokens. In some arrangements, the two-tier model can be between a central provider system 150, provider system 110, and user device 140. In particular, the two-tier model utilizes private networks 135 and an intermediary (e.g., designated banks or financial service providers) between the central bank and the user. In some arrangements, the two-tier model can include receiving a software package by the intermediary (e.g., 110) and installing the software appliance. However, unlike a typical install, the two-tier model can include executing by the provider system 110 various functions to configure and secure the provider system 110 for storing and exchange digital currency tokens.

Referring now to FIG. 3, a flowchart for method 300 of configuring digital currency nodes utilizing a two-tier model, according to some arrangements. Provider system 110 can be configured to perform method 300. Further, any computing device or system described herein can be configured to perform method 300. Additional details regarding the two-tier model are described in detail with reference to FIG. 6.

In broad overview of method 300, at block 310, the one or more processing circuits (e.g., provider system 110 in FIG. 1) can transmit a registration request. At block 320, the one or more processing circuits can receive a software package. At block 330, the one or more processing circuits can install the software appliance. At block 340, one or more processing circuits can verify the processing circuit meets one or more system requirements. At block 350, the one or more processing circuits can generate a public and private key pair. At block 360, the one or more processing circuits can harden the provider system. At block 370, the one or more processing circuits can store and configure the software appliance on the processing circuit. At block 380, the one or more processing circuits can authenticate the software appliance. At block 390, the one or more processing circuits can establish a private network connection. Additionally, fewer, or different operations may be performed depending on the particular arrangement. In some arrangements, some or all operations of method 300 may be performed by one or more processors executing on one or more computing devices, systems, or servers. In various arrangements, each operation may be re-ordered, added, removed, or repeated.

Referring to method 300 in more detail, at block 310, the one or more processing circuits (e.g., provider system 110, in particular configuration system 118 in FIG. 1) can transmit, to a central provider system, a registration request including authentication information. The registration request can be a data packet including metadata for installing a software appliance or software application on the provider system 110. In some arrangements, the metadata can include network or environmental data, activity data, and/or additional data for performing an install of the software appliance.

At block 320, the one or more processing circuits can receive a software package including a software appliance and executable code. In some arrangements, the executable code can include a software stack that, when executes, stores and configures the software appliance on the one or more processing circuits. In particular, the software appliance 122 can be saved in a software stack (e.g., code, configuration information and files, requirement descriptions, operating system registry change descriptions, and/or appliance data) and delivered to the one or more processing circuit. The software appliance 122 can be delivered via network 130. Alternatively, the software appliance 122 can be downloaded or accessed via a virtual device (e.g., data sources 160 or central provider system 110). In some arrangements, the software appliance 122 including the software stack can be delivered as an image or an electronic file via the network 130 (or 135) to the one or more processing circuits.

At block 330, the one or more processing circuits install the software appliance including a software stack. Referring to installing in general, the information stored in the software stack may be used by the one or more processing circuits to attach the software appliance 122 (also referred to herein as "installed"). In some arrangements, after a software appliance 122 is "detached" from the central provider system 150 the software appliance 122 can be reattached and/or restarted on the one or more processing circuits. For example, the software stack can be sent via the network 130 to a virtual server in data sources 160. A utility for attaching the software appliance 122 to the provider system 110 can also be provided with the software stack. Additionally, the attaching of the software appliance 122 can also include performing various steps (e.g., verifying the provider system 110, generating a public and private key pair, hardening the provider system 110, and so on) prior to or in parallel with storing and configuring the software appliance 122. For example, block 330 can register the one or more processing circuits installing (or attaching) the software appliance with the operating system of the one or more processing circuits and then restart (or update) the one or more processing circuits. Similarly, block 330 can register the one or more processing circuits installing the software appliance with the operating system of the virtual server and then restart (or update) the one or more processing circuits.

In various arrangements, installing can include the one or more processing circuits performing some or all of blocks 340-380. At this point, after performing blocks 340-380, the installation process can be considered completed and the software appliance can be running on the one or more processing circuits. At block 340, the one or more processing circuits can verify the processing circuit (e.g., provider system 110) meets one or more system requirements, where the one or more system requirements include at least a hardware requirement. In some arrangements, the one or more processing circuits can scan (e.g., analyze files stored and applications/software installed) and test (e.g., black box testing, end to end testing, accessibility testing, load testing, and so on) the software installed, data stored, and hardware of the one or more processing circuits. As such, the one or more system requirements may be provided in the software package and the executable code can include code to perform the scanning and testing of the provider system 110. For example, to install the software appliance the provider system 110 may need to have a specified version (or minimum version) of an operating system. In another example, to install the software appliance the provider system 110 may need to have a solid-state storage device. In yet another example, to install the software appliance the provider system 110 may need to have a minimum size graphics card (e.g., 4 gigabytes, 8 gigabytes). In yet another example, to install the software appliance the provider system 110 may need an antivirus installed. As shown, the system requirements can be a hardware or software requirement associated with the system in which the software appliance is to be installed.

In some arrangements, block 340 can also include verifying the software appliance is compatible with an operating system of the one or more processing circuits. For example, the operating system versions, the operating system kernel, the glibc version, and/or the kernel parameters may be checked to ensure that the settings in the software appliance match the settings on the one or more processing circuits. The settings in the software appliance may have been stored in the configuration files during the detaching process. In some arrangements, block 340 can also include determining file system layout and permissions of the one or more processing circuits. Different operating systems may have different file system layouts and permissions. For example, some file systems may treat everything in the entire system as a file while other file systems do not. The file system layout and permissions of the one or more processing circuits may be checked to make sure they can be used by the one or more processing circuits in the software appliance.

At block 350, the one or more processing circuits can generate a public and private key pair associated with the software appliance. In particular, the configuration systems (e.g., 118 and 153) can be configured to generate public and private key pairs and provide public keys (e.g., or public and private key pairs) to one or more computing devices (e.g., user devices 140, central provider system 150, third-party devices 170) for use in issuing and exchanging digital currency. In various arrangements, the public and private key pair can be generated based on a cryptographic function (e.g., symmetric-key algorithms (such as DES, AES), asymmetric-key algorithms (Ed25519 signing, ECC), public-key algorithms (such as RSA), and so on) and be stored in the respective key datasets (e.g., 127, 156, 146). In some arrangements, each ledger system (e.g., 125, 155) and token storage (e.g., 146, 176) can maintain (e.g., store and access keys) a key dataset such that each digital currency token may be associated with a public/private key pair stored on the key dataset. Each public/private key pair can be shared amongst a plurality of digital currency tokens or can be unique to each digital currency token.

In some arrangements, the public and private key pair (sometimes referred to as a "verification and signing key pair") can be used in signing and verifying digital currency exchanges utilizing the software appliance. A sender (e.g., a source party such as a user, provider, or entity) can utilize its private key to generate a digital signature. The process of signing the message uses a mathematical operation that can only be performed by the device (e.g., 110, 140, 150, 170) of the sender who possesses the private key. The digital currency token and the digital signature can then be sent to a recipient (e.g., destination address). As will be appreciated, the recipient (e.g., destination party) can be a user, provider, and/or entity that can use the digital signature and the senders public key to verify that the sender is the signer of the digital currency token and that the integrity and origin authenticity of the digital currency token has not been compromised.

At block 360, the one or more processing circuits can harden the provider system 110 (i.e., itself). For example, hardening can include scanning and removing an installed program or a stored file. In another example, hardening can include testing one or more network connections (e.g., above a designated speed such as 100 Mbps, connects via a fiber connection, determine all external current network connections). In yet another example, hardening can include updating an operating system (OS) of the processing circuit (e.g., reverting to a previous OS, upgrading to a new OS). Addition hardening techniques (or steps) can be completed such as, but not limited to applying a patch to the kernel or OS, closing open network ports, and setting up intrusion-detection systems, firewalls and intrusion-prevention systems, deactivate unneeded features in configuration files or perform various other protective measures, and so on. In some arrangements, binary hardening can be performed by the one more processing circuits. That is, the one or more processing circuits executing components of the software stack can analyze binary files and modify the files to protect against potential exploits or vulnerabilities. Furthermore, hardening techniques can also include, but is not limited to, buffer overflow protection or stack-allocated variables, stack overwriting protection, position independent executables and address space layout randomization, binary stirring (e.g., randomizing the address of basic blocks), pointer masking (e.g., protection against code injection), control flow randomization (e.g., to protect against control flow diversion), and so on. In some arrangements, the one or more processing circuits executing the software stack can automatically configure the IP address for the one or more processing circuits, thereby assuring the one or more processing circuits has a valid, unique IP address.

As shown, hardening can include executing components (or code) of the software stack to mitigate or reduce security vulnerabilities of the provider system 110. Additional details regarding hardening are described above with reference to FIG. 1.

At block 370, the one or more processing circuits can, in response to successfully hardening the provider system 110, store and configure the software appliance on the processing circuit based on the software stack, wherein the software appliance is configured to perform digital currency exchanges utilizing the public and private key pair. It should be understood, the software appliance can be an application software designed to meet one or more business or industrial needs (e.g., enabling exchanges and issuances of digital currency). For example, the software appliance can be a digital currency application software for exchanging and issuing digital currency. Storing and configuring can include accessing a memory or device storage and storing the software stack including the executable code for executing and running the software appliance. In various arrangements, if the software appliance is virtual, the one or more processing circuits can setup (e.g., configure) a connection with the server (e.g., 150 or 160) that stores the software appliance to perform digital currency exchanges and issuances. In some arrangements, the software stack includes a plurality of components executable by the processing circuit to perform tasks to configure the software appliance. The software appliance can be configured based on the properties or characteristics of the one or more processing circuits. In general, processing circuits may be very different from each other, for example, they may use different tools or have different configurations. There are various ways to configure the one or more processing circuits for operations and execution of the software appliance.

At block 380, the one or more processing circuits can authenticate the software appliance with the central provider system 150 based on the public key (or private key) of the public and private key pair. In particular, the non-payment authentication can include transmitting a public key and a software appliance identifier (or additional software appliance information such as an installation log) to the configuration system 153 and in response receiving an indication of authentication. The non-payment authentication can include verifying the software appliance was installed correctly based on executing one or more API calls between the configuration system 153 and the one or more processing circuits. In some arrangements, the software appliance (e.g., 122) can be authenticated using additional authentication information (e.g., username/password combinations, device authentication tokens, security question answers, unique software appliance identifier, biometric data, geographic data, social media data, and so on). In some arrangements, authentication can also include using a two-factor authentication. For example, the one or more processing circuits can send a notification including an installation log (e.g., files stored during installation such as the tasks executed during installation) to the central bank (e.g., 150) to confirm the software appliance is installed correctly based on the stored and configured software appliance In some arrangements, authenticating can includes cross-referencing a certificate system (e.g., 160) storing a plurality of public keys. The plurality of public keys can be stored in a secure element of the one or more processing circuits. In various arrangements, the public and private key pair associated with the software appliance may be unique to the processing circuit. In some arrangements, at block 350, the one or more processing circuits can also generate an authentication certification (e.g., digital certificate) unique to the software appliance and the one or more processing circuits. The authentication certificate can be provided to the certification system upon each exchange, registration, or issuance request. In various arrangements, the certification system and one or more processing circuits can exchange digital certificates (one unique to the one or more processing circuits, and another unique to certificate system). In response, both the certification system and one or more processing circuits can verify the others identify and in turn establish a private network connection (e.g., via private network 135).

Additionally, the one or more processing circuits can automatically synchronize, in real-time (or near real-time) via the private network, data of the software appliance with a digital wallet database (e.g., 155) of the configuration system 153. For example, all public and private key pairs or just public keys may be shared (e.g., synced in real-time or based on a period of time such as 1 hour, 1 day, and so on) with the configuration system 153. In another example, all exchanges occurring off-ledger (e.g., between two digital wallet applications) can be shared with the configuration system 153. The configuration system 153 in turn can store the received information such as key pairs and exchange information in the central ledger system 155.

At block 390, the one or more processing circuits can, in response to installing the software appliance, establish, via a private network, a private network connection associated with digital currency issuance. In some arrangements, establishing the private network connection is further in response to authenticating a login by the processing circuit into the software appliance. Additional details regarding establishing a private network connection are described in detail with reference to FIG. 2. It should be understood that the one or more processing circuits can be a node of a plurality of nodes on the private network 135, where the private network connection may be on a child network of the provider system 110, and wherein the provider system 110 is also connected to a parent network of a plurality of provider computing systems. In some arrangements, the child network may be a network of a plurality of nodes storing digital currency tokens (e.g., user devices 140, third-party devices 170, and provider system 110) associated with a particular provider. In various arrangements, the parent network may be a network of a plurality of nodes that have a software appliance 122 installed. As such, the parent network and the plurality of nodes can receive issuances of digital currency since they are connected via the parent network.

Referring now to FIG. 4, a flowchart for a method 400 of configuring digital currency nodes utilizing a one-tier model, according to some arrangements. User device 140 and/or third-party device 170 can be configured to perform method 400. Further, any computing device or system described herein can be configured to perform method 400. Method 400 resembles similar features and functionality, described in detail with reference to method 300. Additional details regarding the one-tier model are described in detail with reference to FIG. 6.

In broad overview of method 400, at block 410, the user device (e.g., processing circuit in FIG. 1) can transmit an installation request. At block 420, the user device can download a digital application. At block 430, the user device can install the digital wallet application. At block 440, user device can verify the user device meets one or more system requirements. At block 450, the user device can generate a public and private key pair. At block 460, the user device can harden the user device. At block 470, the user device can store and configure the digital wallet application on the user device. At block 480, the user device can authenticate the digital wallet application. At block 490, the user device can establish a private network connection. Additionally, fewer, or different operations may be performed depending on the particular arrangement. In some arrangements, some or all operations of method 400 may be performed by one or more processors executing on one or more computing devices, systems, or servers. In various arrangements, each operation may be re-ordered, added, removed, or repeated.

Referring to method 400 in more detail, at block 410, the user device (e.g., user device 140, in particular I/O circuit 140, or third-party device 170 in FIG. 1) can transmit, via an application provider system, an installation request including authentication information. The application provider system can be a data source 160 such as an application store (e.g., stored as an application on the user device or accessed via a website). The application provider system can provide downloadable application to the user device. The installation request can be a data packet including metadata for installing a digital wallet application on user device 140. In some arrangements, the metadata can include network or environmental data, activity data, and/or additional data for performing an install of the digital wallet application. Block 410 resembles similar features and functionality, described in detail with reference to block 310.

At block 420 and 430, the user device can download and install the digital wallet application based on one or more system requirements. The system requirements may be operating system requirements, hardening requirements, software requirements, or any other requirement associated with the installation and configuration of the digital wallet application on the user device. Block 420 and 430 resembles similar features and functionality, described in detail with reference to blocks 320 and 330 respectively.

In various arrangements, installing can include the user device performing some or all of blocks 440-480. At block 440, the user device can verify the user device meets the one or more system requirements, wherein the one or more system requirements include at least a hardware requirement. In some arrangements, the user device can scan (e.g., analyze files stored and applications/software installed) and test (e.g., black box testing, end to end testing, accessibility testing, load testing, and so on) the software installed, data stored, and hardware of the user device. As such, the one or more system requirements may be provided in the software package and the executable code can include code to perform the scanning and testing of the user device 140. For example, to install the digital wallet application the user device 140 may need to have a specified version (or minimum version) of an operating system. In another example, to install the digital wallet application the user device 140 may need to have a solid-state storage device. In yet another example, to install the digital wallet application the user device 140 may need to have a minimum size graphics card (e.g., 4 gigabytes, 8 gigabytes). In yet another example, to install the digital wallet application the user device 140 may need an antivirus installed. As shown, the system requirements can be a hardware or software requirement associated with the system in which the digital wallet application is to be installed. Block 440 resembles similar features and functionality, described in detail with reference to block 340.

At block 450, the user device can generate a public and private key pair associated with the digital wallet application. In particular, the user device can be configured to generate public and private key pairs for use in issuing and exchanging digital currency. In various arrangements, the public and private key pair can be generated based on a cryptographic function (e.g., symmetric-key algorithms (such as DES, AES), asymmetric-key algorithms (Ed25519 signing, ECC), public-key algorithms (such as RSA), and so on) and be stored in the respective key datasets (e.g., 146). In some arrangements, the token storage (e.g., 146) can maintain (e.g., store and access keys) a key dataset such that each digital currency token may be associated with a public/private key pair stored on the key dataset. Each public/private key pair can be shared amongst a plurality of digital currency tokens or can be unique to each digital currency token. Block 450 resembles similar features and functionality, described in detail with reference to block 350.

In some arrangements, the public and private key pair (sometimes referred to as a "verification and signing key pair") can be used in signing and verifying digital currency exchanges utilizing the digital wallet application. A sender (e.g., a source party such as a user, provider, or entity) can utilize its private key to generate a digital signature. The process of signing the message uses a mathematical operation that can only be performed by the user device 140 of the sender who possesses the private key. The digital currency token and the digital signature can then be sent to a recipient (e.g., destination address). As will be appreciated, the recipient (e.g., destination party) can be a user, provider, and/or entity that can use the digital signature and the senders public key to verify that the sender is the signer of the digital currency token and that the integrity and origin authenticity of the digital currency token has not been compromised.

At block 460, the user device, in particular the one or more processing circuits can harden the user device 140 (i.e., itself). For example, hardening can include scanning and removing an installed program or a stored file. In another example, hardening can include testing one or more network connections. In yet another example, hardening can include updating an operating system of the user device. Addition hardening techniques (or steps) can be completed such as, but not limited to applying a patch to the kernel or operating system, closing open network ports, and setting up intrusion-detection systems, firewalls and intrusion-prevention systems, deactivate unneeded features in configuration files or perform various other protective measures, and so on. In some arrangements, binary hardening can be performed by the user device. That is, the user device executing components of the software stack can analyze binary files and modify the files to protect against potential exploits or vulnerabilities. Furthermore, hardening techniques can also include, but is not limited to, buffer overflow protection or stack-allocated variables, stack overwriting protection, position independent executables and address space layout randomization, binary stirring (e.g., randomizing the address of basic blocks), pointer masking (e.g., protection against code injection), control flow randomization (e.g., to protect against control flow diversion), and so on. As shown, hardening can include executing components (or code) of the software package to mitigate or reduce security vulnerabilities of the user device 140. Additional details regarding hardening are described above with reference to FIG. 1. Block 460 resembles similar features and functionality, described in detail with reference to block 360.

At block 470, the user device, in particular the one or more processing circuits, in response to successfully hardening the user device, storing and configuring the digital wallet application on the user device, wherein the digital wallet application is configured to perform digital currency exchanges utilizing the public and private key pair. It should be understood, the digital wallet application can be an application software designed to meet one or more business or industrial needs (e.g., enabling exchanges and issuances of digital currency). For example, the digital wallet application can be a digital currency application software for exchanging and issuing digital currency. Storing and configuring can include accessing a memory or device storage and storing the software stack including the executable code for executing and running the digital wallet application. In various arrangements, if the digital wallet application is virtual, the user device can setup (e.g., configure) a connection with the server (e.g., 150 or 160) that stores the digital wallet application to perform digital currency exchanges and issuances. In some arrangements, the digital wallet application includes a plurality of components executable by the user device to perform tasks to configure the digital wallet application. The digital wallet application can be configured based on the properties or characteristics of the user device. In general, user devices (e.g., 140) may be very different from each other, for example, they may use different tools or have different configurations (e.g., Android™ vs. iOS™). There are various ways to configure the user devices for operations and execution of the digital wallet application. Block 470 resembles similar features and functionality, described in detail with reference to block 370.

At block 480, the user device can authenticate the digital wallet application with a financial computer system (e.g., 110 or 150) based on the public key (or private key) of the public and private key pair. In particular, the non-payment authenticate can include transmitting a public key and a digital wallet application identifier (or additional digital wallet application information such as an installation log) to the configuration system 118 and/or configuration system 153 and in response receiving an indication of authentication. The non-payment authentication can include verifying the digital wallet application was installed correctly based on executing one or more API calls between the configuration system 153 (or 118) and the user device. In some arrangements, the digital wallet application can be authenticated using additional authentication information (e.g., username/password combinations, device authentication tokens, security question answers, unique digital wallet application identifier, biometric data, geographic data, social media data, and so on). In some arrangements, authentication can also include using a two-factor authentication. For example, the user device can send a notification including an installation log (e.g., files stored during installation such as the tasks executed during installation) to the central bank (e.g., 150) to confirm the digital wallet application is installed correctly based on the stored and configured digital wallet application. Block 480 resembles similar features and functionality, described in detail with reference to block 380.

In some arrangements, authenticating can includes cross-referencing a certificate system storing a plurality of public keys. The plurality of public keys can be stored in a secure element of the user device (e.g., 146). In various arrangements, the public and private key pair associated with the digital wallet application may be unique to the user device. In some arrangements, at block 450, the one or more processing circuits can also generate an authentication certification (e.g., digital certificate) unique to the digital wallet application and the user device. The authentication certificate can be provided to the certification system upon each exchange, registration, or issuance request. In various arrangements, the certification system and user device can exchange digital certificates (one unique to the user device, and another unique to certificate system). In response, both the certification system and user devices can verify the others identify and in turn establish a private network connection (e.g., via private network 135).

Additionally, the user device can automatically synchronize, in real-time (or near real-time) via the private network (also referred to as a "digital wallet network"), data of the digital wallet application with a digital wallet database (e.g., 125, 155) of the configuration system 153 (or 118). For example, all public and private key pairs or just public keys may be shared (e.g., synced in real-time or based on a period of time such as 1 hour, 1 day, and so on) with the configuration system 153. In another example, all exchanges occurring off-ledger (e.g., between two digital wallet applications) can be shared with the configuration system 153. The configuration system 153 in turn can stored the received information such as key pairs and exchange information in the central ledger system 155.

At block 490, the user devices can, in response to installing the digital wallet application, establish, via a private network, a private network connection associated with digital currency issuance. In some arrangements, establishing the private network connection is further in response to authenticating a login by the processing circuit into the digital wallet application. Additional details regarding establishing a private network connection are described in detail with reference to FIG. 2. In some arrangements, the user device can connect the central provider system 150 directly via the private network 135 (as described in further detail with reference to the FIG. 6). In various arrangements, the user devices can be a node of a plurality of nodes on the private network 135, and where the private network connection may be on a child network of a provider system 110, and where provider system 110 is connected to a parent network of a plurality of provider computing systems, including the central provider system 150. In some arrangements, the child network may be a network of a plurality of nodes storing digital currency tokens (e.g., user devices 140, third-party devices 170, and provider system 110) associated with a particular provider. In various arrangements, the parent network may be a network of a plurality of nodes that have a software appliance 122 installed. As such, the parent network and the plurality of nodes can receive issuances of digital currency since they are connected via the parent network. Block 490 resembles similar features and functionality, described in detail with reference to block 390.

Figure 5:
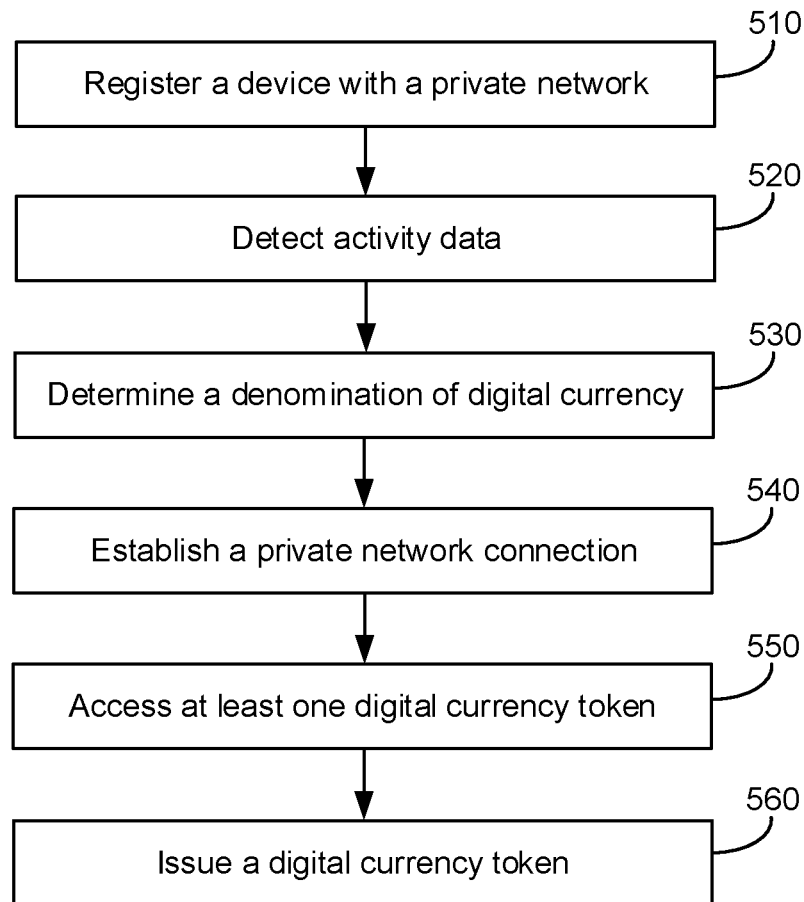
FIG. 5 is a flowchart for a method of micro-allocating digital currency, according to some arrangements.

Referring now to FIG. 5, a flowchart for a method 500 of micro-allocating digital currency, according to some arrangements. Central provider system 150 and/or provider system 110 can be configured to perform method 500. Further, any computing device or system described herein can be configured to perform method 500.

In broad overview of method 500, at block 510, the one or more processing circuits (e.g., third-party devices 170 or any other device or system in FIG. 1) can register a device with a private network. At block 520, the one or more processing circuits can detect activity data. At block 530, the one or more processing circuits can determine a denomination of digital currency. At block 540, one or more processing circuits can establish a private network connection. At block 550, the one or more processing circuits can access at least one digital currency token. At block 560, the one or more processing circuits can issue a digital currency token. Additionally, fewer, or different operations may be performed depending on the particular arrangement. In some arrangements, some or all operations of method 500 may be performed by one or more processors executing on one or more computing devices, systems, or servers. In various arrangements, each operation may be re-ordered, added, removed, or repeated.

Referring to FIG. 5. in general, method 500 relates to providing the good providers (e.g., groceries, construction and/or hardware rentals, home improvement supplies, government) and/or service provider (e.g., utility companies (e.g., water utility, gas utility, electric utility), lawn care businesses, gig-economy companies (e.g., Uber™, DoorDash™), internet service providers (ISPs) (e.g., AT&T™, Spectrum™), phone service providers (PSPs) (e.g., T-Mobile™, Verizon™) streaming companies (e.g., Netflix™, Hulu™, Disney+™) with access to a digital wallet application holding digital currency and enabling real-time (or near real-time) payment (i.e., micro-allocation) of digital currency as the good and/or service providers provides a good or service. That is, access can include detecting activity data of a device associated with the good and/or service and issuing digital currency from the digital wallet application (e.g., 144) of the customer to the digital wallet application (e.g., 174) the good or service provider. In some arrangements, a discount (e.g., 1% discount on the exchange, 5 CBDC discount on the exchange, no activation fee) can be provided to the digital wallet holder to allow the access to the digital wallet application. In particular, a discount could be provided because credit card companies (e.g., Visa™, Mastercard™, Clearinghouse) do not need a cut and can reduce late payments and/or defaults.

For example, instead of having to file taxes, a user device 140 could be communicably coupled over a private network (e.g., 135) such that the IRS could make deposits (e.g., tax payments) and withdrawals (e.g., stimulus checks) using digital currency stored in a digital wallet application of the user device 140 based on received activity data (e.g., tax data such as employer and IRS documents). In another example, instead of paying electricity each month, an IoT device 145 could be communicably coupled over a private network such that the electricity company could make deposits (e.g., green energy credits) and withdrawals (e.g., electricity usage) using digital currency stored in a digital wallet application of the user device 140 based on received activity data (e.g., electricity data). In yet another example, instead of paying a streaming service monthly, a user device 140 could be communicably coupled over a private network such that the streaming service company could make deposits (e.g., credits) and withdrawals (e.g., based on streaming usage) using digital currency stored in a digital wallet application of the user device 140 based on received activity data (e.g., streaming data). In yet another example, instead of paying a driving service (e.g., Uber™) before the ride, a user device 140 (e.g., using the GPS) or IoT device 145 (e.g., vehicle locator such as a GPS install in the vehicle) could be communicably coupled over a private network such that the driving service company could make deposits (e.g., upon a canceled ride) and withdrawals (e.g., during the ride) using digital currency stored in a digital wallet application of the user device 140 based on received activity data (e.g., application data, geographic data).

Accordingly, this enables real-time metering (or analysis) of goods or services provided and providing incremental payments (sometime referred to herein a "micro-allocating") based on the metering. Furthermore, directly communicating between a third-party (e.g., good or service provider) and the customer to perform digital currency exchanges in real-time (or near real-time) can improve network reliability (e.g., one connection instead of multiple connection between the customer, credit card company, bank, and good or service provider) and reduce and/or eliminate the additional processing performed using traditional payment rails such as credit card payment rails. It should be understood that while the processing circuit described in FIG. 5 is described as a third-party device 170, the central provider system 150 and/or provider system 110 can also perform the blocks described below.

Referring to method 500 in more detail, at block 510, the processing circuit (e.g., third-party device 170 or any other device or system in FIG. 1) can register a device with a private network (e.g., 135), wherein the device is associated with a digital wallet application. In some arrangements, the device can be an IoT device 145 or a user device 140. In various arrangements, if a user device 140 is registered, block 540 can be performed prior to block 520 and 530. In some arrangements, the processing circuit can receive a registration request and register a device (e.g., IoT device 145) for micro-allocating digital currency using a digital wallet network (e.g., private network 135). In particular, registration can include associating or linking the device to the digital wallet application of a customer of the third-party. In determining the digital wallet application associated with the device, the processing circuit can analyze data stored by and on the IoT device 145 (e.g., user data, location data, activity data, network information). Alternatively or in combination, the user device 140 associated with the digital wallet application that desires to be setup for micro-allocating digital currency can provide a notification from the processing circuit indicating a desire to register (e.g., registration request). For example, a flow meter (e.g., 145) measuring water usage may be registered by a water provider (e.g., 170) based on communicating over the private network. In yet another example, a television (e.g., 145) measuring data and streaming usage may be registered by a streaming service provider (e.g., 170) based on communicating over the private network.

In various arrangements, registration includes similar features and functionalities of establishing a private network connection as described above but instead registering the device with the private network enables the device (e.g., 145) to send activity data in real-time and at various intervals. As such, prior to establishing a private network connection the processing circuit can register the device with the private network connection. Additional details regarding establishing a private network connection are described in detail with reference to FIG. 2. It should be understood that the processing circuits (e.g., IoT devices) can be a node of a plurality of nodes on the private network 135. Registering a device can include, but is not limited to, providing various identifying information (e.g., device name, geolocation, identifier, etc.), platform designations (e.g., iOS™, Android™, and so on), and authentication information (e.g., username, password, two-step criteria, security questions, address information, etc.). Once the processing circuit approves a registration request, the information associated with the request may be stored in a storage of the third-party device 170. Additionally, a notification may be transmitted to the user device 140 associated with the digital wallet application of the device indicating the device is registered and can provide activity data associated with usage of goods and services.

In some arrangements, a customer of a third-party may have multiple devices (e.g., multiple televisions, multiple flow meters, multiple electricity meters, pending exchanges, multiple devices storing the gig-economy application) and processing circuit may register each or some of the devices to be associated with a digital wallet application. In various arrangements, a user device 140 can store a plurality of a digital wallet applications such that a particular device may be designated for a particular digital wallet application. In particular, a user device 140 can include a first digital wallet application for paying utilities and storing various digital currency tokens, and a second digital wallet application for paying for other services (e.g., grocery delivery, gig-economy services). In various arrangements, the device may communicably couple via the private network (e.g., digital wallet network) with the third-party device 170 without registering. In some arrangements, registering includes communicably coupling the device (e.g., 145), the digital wallet application (e.g., 144), and the third-party digital wallet application (e.g., 174) with the processing circuit via an API.

At block 520, the processing circuit can detect (or receive, or collect), from the registered device via the private network, activity data corresponding to a use of the device. In some arrangements, the processing circuit can establish, utilizing an application programming interface (API), a data feed with the device (e.g., 140, 145) and can monitor the data feed including executing API calls with the API, where the API calls return the activity data. In some arrangements, the activity data can be selectively collected or detected based on the receiving a registration or issuance request. The one or more devices and/or systems described herein can use one or more input devices (e.g., 172) to detect, receive, collect and aggregate the activity data into an activity dataset. The activity data can include, but is not limited to, usage of one or more goods or services, user device usage, website usage, and so on.

For example, a registered user device, upon usage of a ride share request, the activity data may be detected (or collected/accessed) by the processing circuit of the third-party device 170 that can include trip information, location information, cost information, tax information, recipient information, and so on. In the following example, as the trip occurs and activity data is continuously and/or sporadically detected in real-time (or near real-time) an initiation of an exchange of digital currency tokens of a denomination can occur as described with reference to blocks 530-560 described below. In another example, the processing circuit can detect (or collect/access) activity data upon an electrical meter (e.g., IoT device 145) measurement increasing as energy is consumed by a user (e.g., dryer running, lights on, refrigerator on, and so on) that can include voltage (volts) and current (amperes) at a given time or over a period of time (e.g., each second, each minute). In the following example, as the electricity is used and activity data is continuously and/or sporadically detected in real-time (or near real-time) an initiation of an exchange of digital currency tokens of a denomination can occur as described with reference to blocks 530-560 described below. In yet another example, the processing circuit can detect (or collect/access) activity data upon an receiving an exchange or issuance request (e.g., from a digital wallet application 144 or digital wallet application 174) that can include the pending amount (e.g., an amount not fully processed or exchanged), good or service provided (e.g., hotel, apartment, bike, rental, and so on), and additional exchange information (e.g., date, period of stay, period of rental, and so on). In the following example, as the good or service provided is used (e.g., stay at a hotel for 1 day of the 4 day stay) a micro-amount (e.g., less than 20% of the entire pending amount) can be fully processed (e.g., transfer from one digital wallet application or ledger to another such that a portion of the pending amount is not pending anymore).

In general, the processing circuit can detect, receive, collect, aggregate, and/or scan activity data from a plurality of data channels. Each data channel of the plurality of data channels may be communicatively connected to the one or more processing circuits via a data channel communication network (e.g., 135) such that each data channel can be a computing device (e.g., user devices 140, central provider system 150, data sources 160, third-party devices 170) that can store, generate, and collect activity data. Further, the processing circuits can also collect activity data by querying a plurality of data sources (e.g., user devices 140, central provider system 150, data sources 160, third-party devices 170).

At block 530, the processing circuit can determine a denomination of digital currency for an off-chain exchange between a third-party digital wallet application and the digital wallet application based on the activity data. In various arrangements, the processing circuit can store the conversion table in memory or a data storage (e.g., main memory 715 and storage device 725 of FIG. 7). In various arrangements, the denomination can be based on the usage of a good or service and a corresponding conversion table. In particular, the conversion table can correspond any one or more units (e.g., measurements such as, but not limited to, length (e.g., miles, meters), volume (e.g., gallons, liters), electricity (e.g., watts, joules), heat (therms), pressure, mass, time (e.g., minutes, hours, days)) to a given rate or price (e.g., CBDC/kWh, CBDC/gallon, Bitcoin/therm, CBDC/mile, Ethereum/minute). For example, the conversion table for electricity usage may be CBDC (or another digital currency) per kilowatt hours (kHw). In the particular example, given an electricity measurement of 5 kWh of consumption (e.g., activity data) by the IoT device based on the last reading (e.g., every 5 seconds, every minute) and a conversion table indicating all consumption is 0.12 CBDC (or Bitcoin, Ethereum, Dogecoin) per kWh, the denomination of digital currency can be determined to be 0.60 CBDC (5 kWh*0.12 CBDC/kWh) based on the activity data. In another example, the conversion table for a gig-economy transportation ride may be CBDC (or another digital currency) per mile. In the particular example, given a speedometer reading of 5 miles of driving (e.g., activity data) by the IoT device based on the last reading (e.g., every 3 minutes) and a conversion table indicating all consumption is 1.50 CBDC (or Bitcoin, Ethereum, Dogecoin) per mile, the denomination of digital currency can be determined to be 7.5 CBDC (5 miles*0.12 CBDC/mile) based on the activity data.

At block 540, the processing circuit can establish a private network connection between the digital wallet application and the processing circuit. It should be understood that while the device such as the IoT device 145 can communicate via a private network with the processing circuit, the digital wallet application (e.g., 144) can establish a private network connection with the processing circuit (e.g., in particular digital wallet application 174 or EI system 114 or 152). In some arrangements, if the registered device is a user device (e.g., 140) storing the digital wallet application (e.g., 144) of the user (e.g., customer) including a token storage (e.g., 146), then block 540 can be skipped. Furthermore, the private network connection can allow for secure communication and secure transfer of data to/from the one or more processing circuits over the private network 135 (e.g., secure VPN connection, secure wired connection, and so on) utilizing a secure network protocol (e.g., Secure Shell (SSL), Kerberos, IPSec, Secure Sockets Layer (SSL), Hypertext Transfer Protocol Secure (HTTPS), and so on). In various arrangements, prior to transferring or transmitting digital currency tokens from a source device (e.g., 140) to a destination device (e.g., 170) a private network connection may be established. In some arrangements, a private network connection can be established between two systems or devices (e.g., 170 and 140) such that any communications (e.g., data transfers) can be encrypted before being sent and then decrypted upon receipt. Additional details regarding establishing a private network connection are described in detail with reference to FIG. 2.

At block 550, the processing circuit can access and identify, via the private network, at least one digital currency token greater or equal to the denomination stored in a secure element of a user device include the digital wallet application. In some arrangements, the processing circuit can access and identify at least one digital currency token utilizing API, and can execute API calls with the API, where the API calls return the at least one digital currency token. In some arrangements, the digital currency tokens can be selectively collected or detected based on remoting into and/or accessing the secure element of the user device via the API. The digital currency tokens may be stored in token storage 146 and the processing circuit may utilize a public or private key (or authentication certificate) to access the token storage 146. The processing circuit may determine an address of the at least one digital currency token to exchange or issue based on accessing the token storage and identifying the at least one digital currency token. At block 560, the processing circuit can issue (or exchange) a digital currency token based on a rule dataset and the at least one digital currency token, wherein issuing includes assigning, via the private network, the denomination to a third-party digital wallet address of the third-party digital wallet application. In various arrangements, issuing can include generating a public and private key pair associated with the digital wallet application and storing the public and private key pair in the secure element of the user device. In some arrangements, issuing can also include signing the digital currency token using the private key of the public and private key pair based on assessing the secure element of the user via the private network (e.g., 135), storing the signed digital currency token and a public key of the public and private key pair to the third-party digital wallet address (e.g., stored in token storage 176), and automatically removing the public and private key pair from the secure element of the user device (e.g., based on an API call or request to token storage 146). In some arrangements, the denomination is available for withdrawal as the fiat currency in real-time, wherein issuing can include withdrawing, by the processing circuit in real-time, a portion of the denomination of the digital currency token as the fiat currency. Additional details regarding issuing are described in detail with reference to FIG. 2.

In some arrangements, for example at block 510, the processing circuit can also register the digital wallet application with the private network, wherein the digital wallet application is installed on the user device. Further, for example at block 510, the processing circuit can also register the third-party digital wallet application with the private network and pre-authorize the third-party digital wallet application to receive real-time off-chain exchanges from the digital wallet application based on the usage (e.g., activity data) of the device. In particular, the real-time off-chain exchanges can include a public or public and private key pair stored by the digital wallet application and for exchanges a digital currency token from the user device 140 to the third-party device 170 (e.g., processing circuit). That is, as the device is used and activity data is received by the processing circuit (e.g., 170), the processing circuit may be pre-authorized to "withdraw" (e.g., exchange digital currency from a source address to a destination address, where the source address is associated with the digital wallet application and the destination address is associated with the processing circuit. Additionally, pre-authorizing can include executing smart contracts by the processing circuit to request authentication information from the digital wallet application to confirm the pre-authorization of the third-party digital wallet application and in response to authenticating the digital wallet application based on the authentication information, establishing another private network connection between the third-party digital wallet application and the processing circuit.

Referring now to FIG. 6, a block diagram of a digital currency architecture 600 is shown, according to an illustrative implementation. The digital currency architecture 600 is shown to include a one-tier model 610 including central provider system 150, private networks 135, and user device 140. The digital currency architecture 150 is also shown to include a two-tier model 620 including central provider system 150, private networks 135, provider system 110, and user device 140. The one-tier model 610 is described in detail above with reference to FIG. 4 and the two-tier model 620 is described in detail above with reference to FIG. 3. The provider system 110, private network 135, user device 140, and central provider system 150 are described in detail with reference to FIG. 1.

In some arrangements, the one-tier model 610 includes a direct connection (e.g., private network connection) between the central provider system 150 and the user device 140. As such, the user device 140 can transmit issuance requests to the central provider system 150 without an intermediary. In various arrangements, the one-tier model 610 can provide advantages over the two-tier model 620 by reducing network endpoints, reducing additional computing power associated with operating an intermediary such as provider system 110, as well as increasing the access to digital currency by allowing the user to directly request digital currency tokens from the central provider system 150.

In various arrangements, the two-tier model 620 includes an intermediary with two separate private network connection (e.g., one between the central provider system 150, and another between the provider system 110 and user device 140). As such, the user device 140 can transmit issuance requests to the provider system 110 who can issue digital currency tokens from the ledger (e.g., 125) of the provider system 110. If the provider system 110 does not have sufficient funds the provider system 110 can in turn request additional digital currency tokens from central provider system 150. In various arrangements, the two-tier model 620 can provide advantages over the one-tier model by increasing security of digital currency token issuance since the provider system 110 has an installed software appliance 122, as well as reducing complexity from the user side of communicating with a central bank (e.g., 150).

Figure 7:
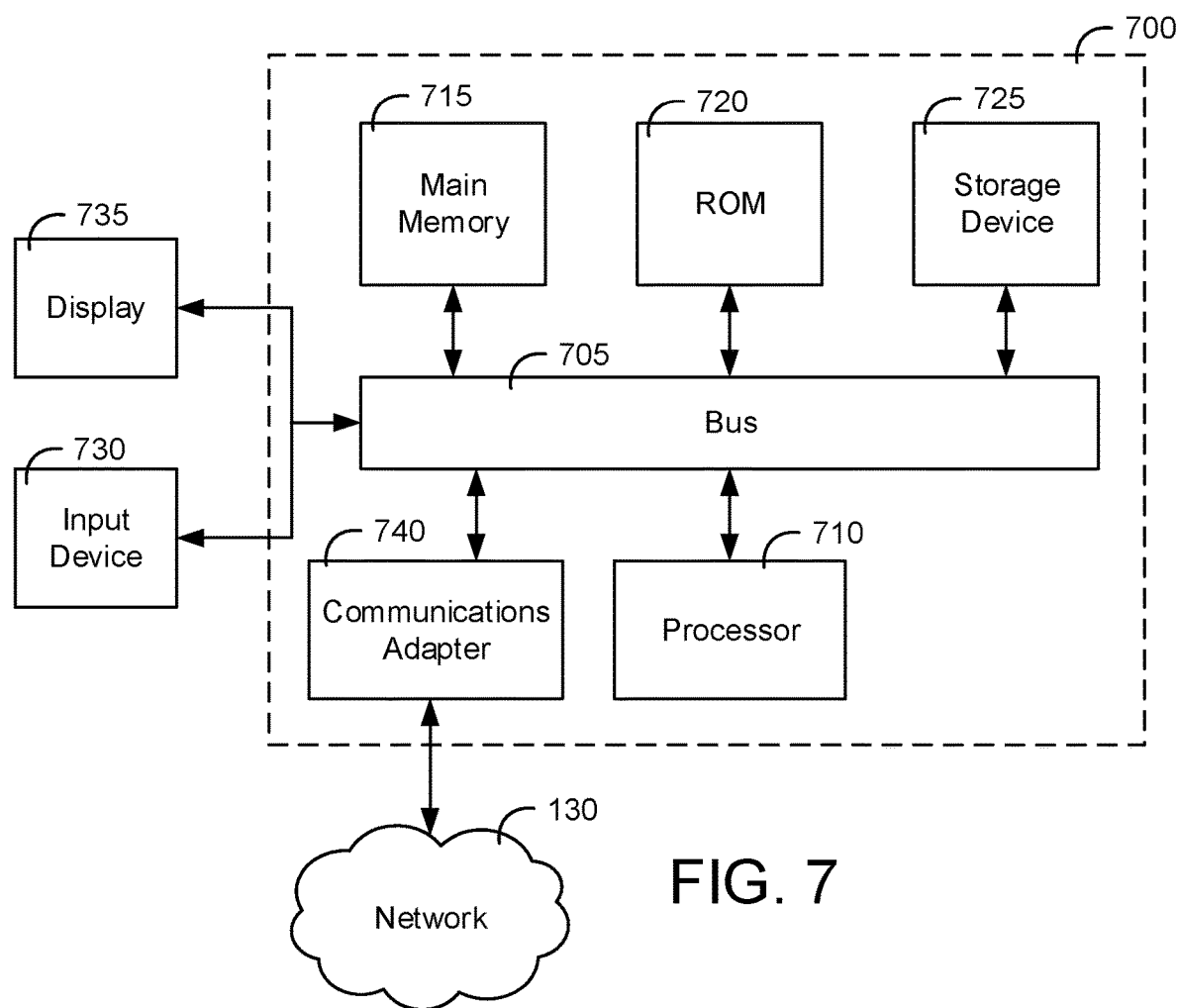
FIG. 7 is a block diagram illustrating an example computing system suitable for use in the various arrangements described herein.

Referring now to FIG. 7, a depiction of a computer system 700 is shown. The computer system 700 that can be used, for example, to implement a computing environment 100, provider computing system 110, user devices 140, central provider system 150, data sources 160, and third-party devices 170, and/or various other example systems described in the present disclosure. The computing system 700 includes a bus 705 or other communication component for communicating information and a processor 710 coupled to the bus 705 for processing information. The computing system 700 also includes main memory 715, such as a random-access memory (RAM) or other dynamic storage device, coupled to the bus 705 for storing information, and instructions to be executed by the processor 710. Main memory 715 can also be used for storing position information, temporary variables, or other intermediate information during execution of instructions by the processor 710. The computing system 700 may further include a read only memory (ROM) 720 or other static storage device coupled to the bus 705 for storing static information and instructions for the processor 710. A storage device 725, such as a solid-state device, magnetic disk, or optical disk, is coupled to the bus 705 for persistently storing information and instructions.

The computing system 700 may be coupled via the bus 705 to a display 735, such as a liquid crystal display, or active matrix display, for displaying information to a user. An input device 730, such as a keyboard including alphanumeric and other keys, may be coupled to the bus 705 for communicating information, and command selections to the processor 710. In another arrangement, the input device 730 has a touch screen display 735. The input device 730 can include any type of biometric sensor, a cursor control, such as a mouse, a trackball, or cursor direction keys, for communicating direction information and command selections to the processor 710 and for controlling cursor movement on the display 735.

In some arrangements, the computing system 700 may include a communications adapter 740, such as a networking adapter. Communications adapter 740 may be coupled to bus 705 and may be configured to enable communications with a computing or communications network 130 (e.g., communications network 130 can include a private network 135) and/or other computing systems. In various illustrative arrangements, any type of networking configuration may be achieved using communications adapter 740, such as wired (e.g., via Ethernet), wireless (e.g., via Wi-Fi™, Bluetooth™), satellite (e.g., via GPS) pre-configured, ad-hoc, LAN, and WAN.

According to various arrangements, the processes that effectuate illustrative arrangements that are described herein can be achieved by the computing system 700 in response to the processor 710 executing an arrangement of instructions contained in main memory 715. Such instructions can be read into main memory 715 from another computer-readable medium, such as the storage device 725. Execution of the arrangement of instructions contained in main memory 715 causes the computing system 700 to perform the illustrative processes described herein. One or more processors in a multi-processing arrangement may also be employed to execute the instructions contained in main memory 715. In alternative arrangements, hard-wired circuitry may be used in place of or in combination with software instructions to implement illustrative arrangements. Thus, arrangements are not limited to any specific combination of hardware circuitry and software.

That is, although an example processing system has been described in FIG. 7, arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 7 as singular, stand-alone devices, one of ordinary skill in the art will appreciate that, in some arrangements, the computing system 700 may include virtualized systems and/or system resources. For example, in some arrangements, the computing system 700 may be a virtual switch, virtual router, virtual host, or virtual server. In various arrangements, computing system 700 may share physical storage, hardware, and other resources with other virtual machines. In some arrangements, virtual resources of the network 130 and private network 135 (e.g., network 130 or private network 135 of FIG. 1) may include cloud computing resources such that a virtual resource may rely on distributed processing across more than one physical processor, distributed memory, etc.

While this specification contains many specific implementation details and/or arrangement details, these should not be construed as limitations on the scope of any inventions or of what may be claimed, but rather as descriptions of features specific to particular implementations and/or arrangements of the systems and methods described herein. Certain features that are described in this specification in the context of separate implementations and/or arrangements can also be implemented and/or arranged in combination in a single implementation and/or arrangement. Conversely, various features that are described in the context of a single implementation and/or arrangement can also be implemented and arranged in multiple implementations and/or arrangements separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, features described with respect to particular headings may be utilized with respect to and/or in combination with illustrative arrangement described under other headings; headings, where provided, are included solely for the purpose of readability and should not be construed as limiting any features provided with respect to such headings.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying FIGS. do not necessarily require the particular order shown, or sequential order, to achieve desirable results.

In certain circumstances, multitasking and parallel processing may be advantageous. Moreover, the separation of various system components in the implementations and/or arrangements described above should not be understood as requiring such separation in all implementations and/or arrangements, and it should be understood that the described program components and systems can generally be integrated together in a single software product or packaged into multiple software products.

Having now described some illustrative implementations, implementations, illustrative arrangements, and arrangements it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed only in connection with one implementation and/or arrangement are not intended to be excluded from a similar role in other implementations or arrangements.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations and/or arrangements consisting of the items listed thereafter exclusively. In one arrangement, the systems and methods described herein consist of one, each combination of more than one, or all of the described elements, acts, or components.

Any references to implementations, arrangements, or elements or acts of the systems and methods herein referred to in the singular may also embrace implementations and/or arrangements including a plurality of these elements, and any references in plural to any implementation, arrangement, or element or act herein may also embrace implementations and/or arrangements including only a single element. References in the singular or plural form are not intended to limit the presently disclosed systems or methods, their components, acts, or elements to single or plural configurations. References to any act or element being based on any information, act or element may include implementations and/or arrangements where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

Any arrangement disclosed herein may be combined with any other arrangement, and references to "an arrangement," "some arrangements," "an alternate arrangement," "various arrangements," "one arrangement" or the like are not necessarily mutually exclusive and are intended to indicate that a particular feature, structure, or characteristic described in connection with the arrangement may be included in at least one arrangement. Such terms as used herein are not necessarily all referring to the same arrangement. Any arrangement may be combined with any other arrangement, inclusively or exclusively, in any manner consistent with the aspects and arrangements disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations and/or arrangements are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, and/or sensors. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the embodiments might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

What is claimed is:

1. A method of private network issuance of digital currency, comprising:
    establishing, by a processing circuit via a first private network, a first private network connection between a digital wallet application of a user device and the processing circuit;
    receiving, by the processing circuit, an issuance request associated with a first denomination of digital currency;
    issuing, by the processing circuit, a first digital currency token, wherein issuing is an off-chain exchange transferring the first denomination outside a digital currency ledger, and wherein issuing comprises:
        generating, by the processing circuit, the first digital currency token comprising one or more metadata fields based on a reallocation of at least one digital currency token of a plurality of digital currency tokens stored on the digital currency ledger, wherein reallocation comprises updating a token value of the at least one digital currency token on the digital currency ledger utilizing at least one public and private key pair;
        generating, by the processing circuit, an issuance identifier associated with the issuance request;
        setting, by the processing circuit, the issuance identifier in an identifier field of the one or more metadata fields of the first digital currency token; and
        transmitting, by the processing circuit via the first private network, the first digital currency token to the digital wallet application.

2. The method of claim 1, wherein issuing the first digital currency token is based on a rule dataset, wherein the rule dataset comprises a plurality of authorization rules limiting one or more functionalities of the first digital currency token, and wherein the plurality of digital currency tokens represents a tradable asset.

3. The method of claim 1, wherein the identifier field of the digital currency token further comprises a banknote identifier associating the digital currency token with a central provider system.

4. The method of claim 3, further comprising:
    tracking, by the processing circuit, the first digital currency token stored in the digital wallet application based on the identifier field, wherein tracking occurs based on an opt-in by the user device.

5. The method of claim 1, wherein in response to determining the digital currency ledger has deficient funds to satisfy the issuance request, the method further comprises:
    establishing, by the processing circuit via a second private network, a second private network connection between a central provider system and the processing circuit;
    transmitting, by the processing circuit via the second private network, a replenishment request associated with a second denomination of additional digital currency, wherein the second denomination is greater than the first denomination;
    receiving, by the processing circuit via the second private network, additional digital currency tokens comprising one or more metadata fields based on the replenishment request;
    storing, by the processing circuit, the additional digital currency tokens;
    updating, by the processing circuit, the digital currency ledger based on the second denomination of additional digital currency.

6. The method of claim 1, wherein the processing circuit comprises a software appliance configured to establish the first private network connection, and wherein establishing the first private network connection further comprises:
    installing, by the processing circuit, the software appliance comprising a software stack.

7. The method of claim 6, wherein installing the software appliance by the processing circuit comprises:
    verifying the processing circuit meets one or more system requirements, wherein the one or more system requirements comprises at least a hardware requirement;
    hardening the processing circuit;
    in response to successfully hardening the processing circuit, storing and configuring the software appliance on the processing circuit based on the software stack; and
    authenticating the software appliance with a central provider system.

8. The method of claim 1, wherein establishing the first private network connection is in response to authenticating, by the processing circuit, a login by the user device into the digital wallet application.

9. The method of claim 1, wherein the reallocation of the at least one digital currency token comprises either:
    splitting, by the processing circuit, a second digital currency token into the first digital currency token comprising the first denomination and a third digital currency token comprising a leftover denomination, wherein the first digital currency token and the third digital currency token are copied by the processing circuit to comprise the one or more metadata fields of the second digital currency token; or
    aggregating at least two digital currency tokens of the plurality of digital currency tokens comprising an aggregate denomination of the at least two digital currency tokens and copies of the one or more metadata fields of each of the at least two digital currency tokens.

10. The method of claim 1, wherein generating the digital currency token comprises both:
    splitting, by the processing circuit, a second digital currency token into the first digital currency token comprising the first denomination and a third digital currency token comprising a leftover denomination, wherein the first digital currency token and the third digital currency token are copied by the processing circuit to comprise the one or more metadata fields of the second digital currency token; and
    aggregating at least two digital currency tokens of the plurality of digital currency tokens comprising an aggregate denomination of the at least two digital currency tokens and copies of the one or more metadata fields of each of the at least two digital currency tokens, and wherein the at least two digital currency tokens comprise the first digital currency token.

11. The method of claim 1, wherein issuing further comprises:
    updating, by the processing circuit, the digital currency ledger based on the first denomination of the first digital currency token.

12. The method of claim 1, wherein the digital currency ledger comprises a blockchain, and wherein the off-chain exchange is an exchange of digital currency occurring off the blockchain.

13. A system comprising:
    at least one processing circuit having at least one processor coupled to at least one memory, the at least one processing circuit configured to:

establish, via a first private network, a first private network connection between a digital wallet application of a user device and the at least one processing circuit;

receive an issuance request associated with a first denomination of digital currency;

issue a first digital currency token, wherein issuing is an off-chain exchange transferring the first denomination outside a digital currency ledger, and wherein issuing comprises:

generating the first digital currency token comprising one or more metadata fields based on a reallocation of at least one digital currency token of a plurality of digital currency tokens stored on the digital currency ledger, wherein reallocation comprises updating a token value of the at least one digital currency token on the digital currency ledger utilizing at least one public and private key pair;

generating an issuance identifier associated with the issuance request;

setting the issuance identifier in an identifier field of the one or more metadata fields of the first digital currency token; and transmitting, via the first private network, the first digital currency token to the digital wallet application.

14. The system of claim 13, wherein issuing the first digital currency token is based on a rule dataset, wherein the rule dataset comprises a plurality of authorization rules limiting one or more functionalities of the first digital currency token, and wherein the plurality of digital currency tokens represents a tradable asset.

15. The system of claim 13, wherein the at least one processing circuit is further configured to:

track the first digital currency token stored in the digital wallet application based on the identifier field, wherein tracking occurs based on an opt-in by the user device.

16. The system of claim 13, wherein in response to determining the digital currency ledger has deficient funds to satisfy the issuance request, wherein the at least one processing circuit is further configured to:

establish via a second private network, a second private network connection between a central provider system and the at least one processing circuit;

transmit, via the second private network, a replenishment request associated with a second denomination of additional digital currency, wherein the second denomination is greater than the first denomination;

receive, via the second private network, additional digital currency tokens comprising one or more metadata fields based on the replenishment request;

store the additional digital currency tokens;

update the digital currency ledger based on the second denomination of additional digital currency.

17. The system of claim 13, wherein the reallocation of the at least one digital currency token comprises either:

splitting a second digital currency token into the first digital currency token comprising the first denomination and a third digital currency token comprising a leftover denomination, wherein the first digital currency token and the third digital currency token are copied by the at least one processing circuit to comprise the one or more metadata fields of the second digital currency token; or aggregating at least two digital currency tokens of the plurality of digital currency tokens comprising an aggregate denomination of the at least two digital currency tokens and copies of the one or more metadata fields of each of the at least two digital currency tokens.

18. The system of claim 13, wherein generating the digital currency token comprises both:

splitting a second digital currency token into the first digital currency token comprising the first denomination and a third digital currency token comprising a leftover denomination, wherein the first digital currency token and the third digital currency token are copied by the at least one processing circuit to comprise the one or more metadata fields of the second digital currency token; and aggregating at least two digital currency tokens of the plurality of digital currency tokens comprising an aggregate denomination of the at least two digital currency tokens and copies of the one or more metadata fields of each of the at least two digital currency tokens, and wherein the at least two digital currency tokens comprise the first digital currency token.

19. The system of claim 13, wherein the digital currency ledger comprises a blockchain, and wherein the off-chain exchange is an exchange of digital currency occurring off the blockchain.

20. One or more non-transitory computer-readable storage media having instructions stored thereon that, when executed by at least one processing circuit, cause the at least one processing circuit to:

establish, via a first private network, a first private network connection between a digital wallet application of a user device and the processing circuit;

receive an issuance request associated with a first denomination of digital currency;

issue a first digital currency token, wherein issuing is an off-chain exchange transferring the first denomination outside a digital currency ledger, and wherein issuing comprises:

generating the first digital currency token comprising one or more metadata fields based on a reallocation of at least one digital currency token of a plurality of digital currency tokens stored on the digital currency ledger, wherein reallocation comprises updating a token value of the at least one digital currency token on the digital currency ledger utilizing at least one public and private key pair;

generating an issuance identifier associated with the issuance request;

setting the issuance identifier in an identifier field of the one or more metadata fields of the first digital currency token; and transmitting, via the first private network, the first digital currency token to the digital wallet application.

* * * * *